United States Patent
Yang

(10) Patent No.: US 11,950,302 B2
(45) Date of Patent: Apr. 2, 2024

(54) METHOD FOR DATA TRANSMISSION AND ESTABLISHING UNICAST CONNECTION BASED ON SIDELINK

(71) Applicant: BEIJING XIAOMI MOBILE SOFTWARE CO., LTD., Beijing (CN)

(72) Inventor: Xing Yang, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 463 days.

(21) Appl. No.: 17/282,484

(22) PCT Filed: Oct. 18, 2018

(86) PCT No.: PCT/CN2018/110775
§ 371 (c)(1),
(2) Date: Apr. 2, 2021

(87) PCT Pub. No.: WO2020/077583
PCT Pub. Date: Apr. 23, 2020

(65) Prior Publication Data
US 2021/0352747 A1 Nov. 11, 2021

(51) Int. Cl.
*H04W 76/14* (2018.01)
*H04W 76/18* (2018.01)
*H04W 92/18* (2009.01)

(52) U.S. Cl.
CPC ........... *H04W 76/14* (2018.02); *H04W 76/18* (2018.02); *H04W 92/18* (2013.01)

(58) Field of Classification Search
CPC ..... H04W 76/14; H04W 76/15; H04W 76/18; H04W 76/19; H04W 76/20; H04W 76/30; H04W 92/18
See application file for complete search history.

(56) References Cited

U.S. PATENT DOCUMENTS

| 2014/0286243 | A1 | 9/2014 | Yamada | |
| 2015/0282210 | A1* | 10/2015 | Li | H04W 74/004 455/452.2 |
| 2016/0192427 | A1 | 6/2016 | Yun | |
| 2019/0082364 | A1* | 3/2019 | Zhang | H04W 76/16 |
| 2021/0235522 | A1* | 7/2021 | Yang | H04W 8/26 |

(Continued)

FOREIGN PATENT DOCUMENTS

WO 2013141483 A1 9/2013

OTHER PUBLICATIONS

OA for IN application 202147018303, mailed on Feb. 9, 2022.
(Continued)

*Primary Examiner* — Jean A Gelin
(74) *Attorney, Agent, or Firm* — Syncoda LLC; Feng Ma

(57) ABSTRACT

A method for data transmission and establishing unicast connection based on sidelink includes: sending a connection establishment request message for establishing a unicast connection with a second terminal to the second terminal, for determining by the second terminal, whether to agree to establish the unicast connection with the first terminal based on the connection establishment request message; receiving a connection establishment admission message returned by the second terminal; and establishing the unicast connection with the second terminal based on the connection establishment confirmation messages.

16 Claims, 15 Drawing Sheets

(56) References Cited

U.S. PATENT DOCUMENTS

2021/0251023 A1\* 8/2021 Phan .................. H04W 4/70
2021/0385883 A1\* 12/2021 Han .................. H04W 76/10
2021/0400438 A1\* 12/2021 Tran .................. G06F 18/256

OTHER PUBLICATIONS

Search Report for EP application 18937176.8, dated Apr. 26, 2022.
International Search Report in Application No. PCT/CN2018/110775, dated Jul. 1, 2019.
Catt. "Discovery Procedure and Connection Setup Procedure in NR Sidelink" 3GPP TSG-RAN WG2 Meeting #103bis R2-1813731, Oct. 12, 2018, section 2.2.
Lenovo et al. "Connection Establishment for Unicast in NR V2X" 3GPP TSG-RAN WG2 Meeting #103b R2-1814503, Oct. 12, 2018, Section 2.

\* cited by examiner

METHOD FOR DATA TRANSMISSION AND ESTABLISHING UNICAST CONNECTION BASED ON SIDELINK

CROSS-REFERENCE TO RELATED APPLICATION

This application is a U.S. national stage of International Application No. PCT/CN2018/110775 filed on Oct. 18, 2018, the disclosure of which is hereby incorporated by reference in its entirety.

TECHNICAL FIELD

The present disclosure relates to communication technologies, and more particularly, to a method and an apparatus for establishing a unicast connection and data transmission based on sidelink.

BACKGROUND

In the related art, a sidelink communication mode is introduced in order to support a direct connection between terminals. A protocol stack of the sidelink communication mode may be a sum of protocols at each layer of a network, for example, as illustrated in FIG. 1. An interface between the terminals is PC-5.

In a 5G, i.e., NR (new radio) system, a unicast connection may be established based on sidelink to support an enhanced V2X (vehicle to everything) service. However, a method for establishing a unicast connection between terminals based on sidelink is not provided in the related art.

SUMMARY

To overcome the problems existing in the related art, embodiments of the present disclosure provide a method and an apparatus for establishing a unicast connection and data transmission based on sidelink.

According to a first aspect of embodiments of the present disclosure, there is provided a method for establishing a unicast connection based on sidelink. The method is applied to a first terminal. The method includes: sending a connection establishment request message for establishing a unicast connection with a second terminal to the second terminal, for determining by the second terminal, whether to agree to establish the unicast connection with the first terminal based on the connection establishment request message; receiving a connection establishment admission message returned by the second terminal; and establishing the unicast connection with the second terminal based on the connection establishment admission message.

Alternatively, the connection establishment request message carries a terminal identifier of the first terminal and connection establishment associated information, the connection establishment associated information at least includes connection reason information configured to identify a connection reason for establishing the unicast connection with the second terminal.

Alternatively, the connection establishment admission message includes a temporary identifier allocated for the first terminal by the second terminal, the temporary identifier is configured to indicate the first terminal to schedule a transmission resource in a process of establishing the unicast connection with the second terminal.

Alternatively, after sending the connection establishment request message for establishing the unicast connection with the second terminal to the second terminal, the method further includes: receiving a connection establishment rejection message returned by the second terminal, the connection establishment rejection message carrying target duration information; and resending the connection establishment request message to the second terminal in response to an end of a target period. The target period refers to a time period lasting for a duration indicated by the target duration information and starting from a time point when the connection establishment rejection message is received.

According to a second aspect of embodiments of the present disclosure, there is provided a method for establishing a unicast connection based on sidelink. The method is applied to a second terminal. The method includes: receiving a connection establishment request message for establishing a unicast connection with the second terminal from a first terminal; determining whether to agree to establish the unicast connection with the first terminal based on the connection establishment request message; and returning a connection establishment admission message to the first terminal in response to agreeing to establish the unicast connection with the first terminal, the first terminal establishing the unicast connection with the second terminal based on the connection establishment admission message.

Alternatively, the connection establishment request message carries a terminal identifier of the first terminal and connection establishment associated information, the connection establishment associated information at least includes connection reason information configured to identify a connection reason for establishing the unicast connection with the second terminal. Determining whether to agree to establish the unicast connection with the first terminal based on the connection establishment request message includes: determining whether to agree to establish the unicast connection with the first terminal based on the connection establishment associated information.

Alternatively, the method further includes: allocating a temporary identifier for the first terminal in response to agreeing to establish the unicast connection with the first terminal. The temporary identifier is configured to indicate the first terminal to schedule a transmission resource in a process of establishing the unicast connection with the second terminal. Returning the connection establishment admission message to the first terminal includes: returning the connection establishment admission message carrying the temporary identifier to the first terminal.

Alternatively, the method further includes: returning a connection establishment rejection message carrying target duration information to the second terminal in response to disagreeing to establish the unicast connection with the first terminal; and receiving the connection establishment request message resent by the first terminal at an end of a target period. The target period refers to a time period lasting for a duration indicated by the target duration information and starting from a time point when the connection establishment rejection message is received.

According to a third aspect of embodiments of the present disclosure, there is provided a method for data transmission and establishing a unicast connection based on sidelink. The method is applied to a first terminal. The method includes: sending a connection establishment request message for establishing a unicast connection with a second terminal to the second terminal, the second terminal determining whether to agree to establish the unicast connection with the first terminal based on the connection establishment request message; receiving a connection establishment message returned by the second terminal, the connection establishment message including a connection establishment admission message or a connection establishment rejection message; and determining a strategy for data transmission with the second terminal based on the connection establishment message.

Alternatively, the connection establishment admission message includes a temporary identifier allocated for the first terminal by the second terminal in response to the connection establishment message including the connection establishment admission message, the temporary identifier is configured to indicate the first terminal to schedule a transmission resource in a process of establishing the unicast connection based on sidelink. Determining the strategy for data transmission with the second terminal based on the connection establishment message includes: obtaining the temporary identifier in the connection establishment admission message; and performing data transmission with the second terminal based on indication of the temporary identifier.

Alternatively, the connection establishment rejection message includes a transmission indication message in response to the connection establishment message including the connection establishment rejection message, the transmission indication message is configured to indicate a mode of data transmission between the first terminal and the second terminal. Determining the strategy for data transmission with the second terminal based on the connection establishment message includes: obtaining the transmission indication message in the connection establishment rejection message; and performing the data transmission with the second terminal based on the transmission indication message.

Alternatively, the transmission indication message includes a redirection identifier. Performing the data transmission with the second terminal based on the transmission indication message includes: broadcasting target data to the second terminal based on the redirection identifier. The target data refers to data to be sent to the second terminal by the first terminal.

Alternatively, the transmission indication message includes a target multicast address identifier, the target multicast address identifier refers to a group address identifier of a group where the second terminal is located. Performing the data transmission with the second terminal based on the transmission indication message includes: sending target data to a group address corresponding to the target multicast address identifier. The target data refers to data to be sent to the second terminal by the first terminal.

According to a fourth aspect of embodiments of the present disclosure, there is provided a method for data transmission and establishing a unicast connection based on sidelink. The method is applied to a second terminal. The method includes: receiving a connection establishment request message for establishing a unicast connection with the second terminal from a first terminal; determining whether to agree to establish the unicast connection with the first terminal based on the connection establishment request message; and returning a connection establishment message to the first terminal according to a determining result of whether to agree to establish the unicast connection with the first terminal. The connection establishment message includes a connection establishment admission message or a connection establishment rejection message. The first terminal determines a strategy for data transmission with the second terminal based on the connection establishment message.

Alternatively, the connection establishment admission message includes a temporary identifier allocated for the first terminal by the second terminal in response to the connection establishment message including the connection establishment admission message, the temporary identifier is configured to indicate the first terminal to schedule a transmission resource in a process of establishing the unicast connection based on sidelink.

Alternatively, the connection establishment rejection message includes a transmission indication message in response to the connection establishment message including the connection establishment rejection message, the transmission indication message is configured to indicate a mode of data transmission between the first terminal and the second terminal.

Alternatively, the transmission indication message includes a redirection identifier, the redirection identifier is configured to indicate the first terminal to broadcast target data to the second terminal, and the target data refers to data to be sent to the second terminal by the first terminal.

Alternatively, the transmission indication message includes a target multicast address identifier. The target multicast address identifier refers to a group address identifier of a group where the second terminal is located. The target multicast address identifier is configured to indicate the first terminal to send target data to a group address corresponding to the target multicast address identifier. The target data refers to data to be sent to the second terminal by the first terminal.

According to a fifth aspect of embodiments of the present disclosure, there is provided an apparatus for establishing a unicast connection based on sidelink. The apparatus is applied to a first terminal. The apparatus includes: a first sending module, configured to send a connection establishment request message for establishing a unicast connection with a second terminal to the second terminal, for determining by the second terminal, whether to agree to establish the unicast connection with the first terminal based on the connection establishment request message; a first receiving module, configured to receive a connection establishment admission message returned by the second terminal; and a connection establishing module, configured to establish the unicast connection with the second terminal based on the connection establishment admission message.

Alternatively, the connection establishment request message carries a terminal identifier of the first terminal and connection establishment associated information, the connection establishment associated information at least includes connection reason information configured to identify a connection reason for establishing the unicast connection with the second terminal.

Alternatively, the connection establishment admission message includes a temporary identifier allocated for the first terminal by the second terminal, the temporary identifier is configured to indicate the first terminal to schedule a transmission resource in a process of establishing the unicast connection with the second terminal.

Alternatively, the apparatus further includes: a second receiving module, configured to receive a connection establishment rejection message returned by the second terminal, the connection establishment rejection message carrying target duration information; and a second sending module, configured to resend the connection establishment request message to the second terminal in response to an end of a target period. The target period refers to a time period lasting for a duration indicated by the target duration information and starting from a time point when the connection establishment rejection message is received.

According to a sixth aspect of embodiments of the present disclosure, there is provided an apparatus for establishing a unicast connection based on sidelink. The apparatus is applied to a second terminal. The apparatus includes: a third receiving module, configured to receive a connection establishment request message for establishing a unicast connection with the second terminal from a first terminal; a first determining module, configured to determine whether to agree to establish the unicast connection with the first terminal based on the connection establishment request message; and a third sending module, configured to return a connection establishment admission message to the first terminal in response to agreeing to establish the unicast connection with the first terminal, the first terminal establishing the unicast connection with the second terminal based on the connection establishment admission message.

Alternatively, the connection establishment request message carries a terminal identifier of the first terminal and connection establishment associated information, the connection establishment associated information at least includes connection reason information configured to identify a connection reason for establishing the unicast connection with the second terminal. The first determining module includes: a determining sub module, configured to determine whether to agree to establish the unicast connection with the first terminal based on the connection establishment associated information.

Alternatively, the apparatus further includes: a temporary identifier allocating module, configured to allocate a temporary identifier for the first terminal in response to agreeing to establish the unicast connection with the first terminal. The temporary identifier is configured to indicate the first terminal to schedule a transmission resource in a process of establishing the unicast connection with the second terminal. The third sending module includes: a sending sub module, configured to return the connection establishment admission message carrying the temporary identifier to the first terminal.

Alternatively, the apparatus further includes: a fourth sending module, configured to return a connection establishment rejection message carrying target duration information to the second terminal in response to disagreeing to establish the unicast connection with the first terminal; and a fourth receiving module, configured to receive the connection establishment request message resent by the first terminal at an end of a target period. The target period refers to a time period lasting for a duration indicated by the target duration information and starting from a time point when the connection establishment rejection message is received.

According to a seventh aspect of embodiments of the present disclosure, there is provided an apparatus for data transmission and establishing a unicast connection based on sidelink. The apparatus is applied to a first terminal. The apparatus includes: a fifth sending module, configured to send a connection establishment request message for establishing a unicast connection with a second terminal to the second terminal, the second terminal determining whether to agree to establish the unicast connection with the first terminal based on the connection establishment request message; a fifth receiving module, configured to receive a connection establishment message returned by the second terminal, the connection establishment message including a connection establishment admission message or a connection establishment rejection message; and a second determining module, configured to determine a strategy for data transmission with the second terminal based on the connection establishment message.

Alternatively, the connection establishment admission message includes a temporary identifier allocated for the first terminal by the second terminal in response to the connection establishment message including the connection establishment admission message, the temporary identifier is configured to indicate the first terminal to schedule a transmission resource in a process of establishing the unicast connection based on sidelink. The second determining module includes: a first obtaining sub module, configured to obtain the temporary identifier in the connection establishment admission message; and a first performing sub module, configured to perform data transmission with the second terminal based on indication of the temporary identifier.

Alternatively, the connection establishment rejection message includes a transmission indication message in response to the connection establishment message including the connection establishment rejection message, the transmission indication message is configured to indicate a mode of data transmission between the first terminal and the second terminal. The second determining module includes: a second obtaining sub module, configured to obtain the transmission indication message in the connection establishment rejection message; and a second performing sub module, configured to perform the data transmission with the second terminal based on the transmission indication message.

Alternatively, the transmission indication message includes a redirection identifier. The second performing sub module includes: a first sending unit, configured to broadcast target data to the second terminal based on the redirection identifier. The target data refers to data to be sent to the second terminal by the first terminal.

Alternatively, the transmission indication message includes a target multicast address identifier, the target multicast address identifier refers to a group address identifier of a group where the second terminal is located. The second performing sub module includes: a second sending unit, configured to send target data to a group address corresponding to the target multicast address identifier. The target data refers to data to be sent to the second terminal by the first terminal.

According to an eighth aspect of embodiments of the present disclosure, there is provided an apparatus for data transmission and establishing a unicast connection based on sidelink. The apparatus is applied to a second terminal. The apparatus includes: a sixth receiving module, configured to receive a connection establishment request message for establishing a unicast connection with the second terminal from a first terminal; a third determining module, configured to determine whether to agree to establish the unicast connection with the first terminal based on the connection establishment request message; and a sixth sending module, configured to return a connection establishment message to the first terminal according to a determining result of whether to agree to establish the unicast connection with the first terminal. The connection establishment message includes a connection establishment admission message or a connection establishment rejection message. The first terminal determines a strategy for data transmission with the second terminal based on the connection establishment message.

Alternatively, the connection establishment admission message includes a temporary identifier allocated for the first terminal by the second terminal in response to the connection establishment message including the connection establishment admission message, the temporary identifier is configured to indicate the first terminal to schedule a transmission resource in a process of establishing the unicast connection based on sidelink.

Alternatively, the connection establishment rejection message includes a transmission indication message in response to the connection establishment message including the connection establishment rejection message, the transmission indication message is configured to indicate a mode of data transmission between the first terminal and the second terminal.

Alternatively, the transmission indication message includes a redirection identifier, the redirection identifier is configured to indicate the first terminal to broadcast target data to the second terminal, and the target data refers to data to be sent to the second terminal by the first terminal.

Alternatively, the transmission indication message includes a target multicast address identifier, the target multicast address identifier refers to a group address identifier of a group where the second terminal is located, the target multicast address identifier is configured to indicate the first terminal to send target data to a group address corresponding to the target multicast address identifier, and the target data refers to data to be sent to the second terminal by the first terminal.

According to a ninth aspect of embodiments of the present disclosure, there is provided a computer-readable storage medium having computer programs stored therein. The computer programs are configured to implement the method for establishing a unicast connection based on sidelink according to the first aspect of embodiments of the present disclosure.

According to a tenth aspect of embodiments of the present disclosure, there is provided a computer-readable storage medium having computer programs stored therein. The computer programs are configured to implement the method for establishing a unicast connection based on sidelink according to the second aspect of embodiments of the present disclosure.

According to an eleventh aspect of embodiments of the present disclosure, there is provided a computer-readable storage medium having computer programs stored therein. The computer programs are configured to implement the method for data transmission and establishing a unicast connection based on sidelink according to the third aspect of embodiments of the present disclosure.

According to a twelfth aspect of embodiments of the present disclosure, there is provided a computer-readable storage medium having computer programs stored therein. The computer programs is configured to implement the method for data transmission and establishing a unicast connection based on sidelink according to the fourth aspect of embodiments of the present disclosure.

According to a thirteenth aspect of embodiments of the present disclosure, there is provided a device for establishing a unicast connection based on sidelink. The device is applied to a first terminal. The device includes: a processor; and memory configured to store instructions executable the processor. The processor is configured to: send a connection establishment request message for establishing a unicast connection with a second terminal to the second terminal, for determining by the second terminal, whether to agree to establish the unicast connection with the first terminal based on the connection establishment request message; receive a connection establishment admission message returned by the second terminal; and establish the unicast connection with the second terminal based on the connection establishment admission message.

According to a fourteenth aspect of embodiments of the present disclosure, there is provided a device for establishing a unicast connection based on sidelink. The device is applied to a second terminal. The device includes: a processor; and memory configured to store instructions executable the processor. The processor is configured to: receive a connection establishment request message for establishing a unicast connection with the second terminal from a first terminal; determine whether to agree to establish the unicast connection with the first terminal based on the connection establishment request message; and return a connection establishment admission message to the first terminal in response to agreeing to establish the unicast connection with the first terminal, the first terminal establishing the unicast connection with the second terminal based on the connection establishment admission message.

According to a fifteenth aspect of embodiments of the present disclosure, there is provided a device for data transmission and establishing a unicast connection based on sidelink. The device is applied to a first terminal. The device includes: a processor; and memory configured to store instructions executable the processor. The processor is configured to: send a connection establishment request message for establishing a unicast connection with a second terminal to the second terminal, the second terminal determining whether to agree to establish the unicast connection with the first terminal based on the connection establishment request message; receive a connection establishment message returned by the second terminal, the connection establishment message including a connection establishment admission message or a connection establishment rejection message; and determine a strategy for data transmission with the second terminal based on the connection establishment message.

According to a sixteenth aspect of embodiments of the present disclosure, there is provided a device for data transmission and establishing a unicast connection based on sidelink. The device is applied to a second terminal. The device includes: a processor; and memory configured to store instructions executable the processor. The processor is configured to: receive a connection establishment request message for establishing a unicast connection with the second terminal from a first terminal; determine whether to agree to establish the unicast connection with the first terminal based on the connection establishment request message; and return a connection establishment message to the first terminal according to a determining result of whether to agree to establish the unicast connection with the first terminal, the connection establishment message including a connection establishment admission message or a connection establishment rejection message, the first terminal determining a strategy for data transmission with the second terminal based on the connection establishment message.

The technical solution provided in embodiments of the present disclosure may include the following beneficial effects.

In embodiments of the present disclosure, the first terminal may send the connection establishment request message to the second terminal, and requests to establish the unicast connection with the second terminal through the connection establishment request message. The second terminal determines whether to agree to establish the unicast connection with the first terminal based on the connection establishment request message. The first terminal may establish the unicast connection with the second terminal based on the connection establishment admission message returned by the second terminal. Through the above process, a unicast connection between two terminals may be quickly established based on sidelink.

In embodiments of the present disclosure, the connection establishment request message sent by the first terminal may include the terminal identifier of the first terminal and the connection establishment associated information. The connection establishment associated information at least includes the connection reason information configured to identify a connection reason for establishing the unicast connection with the second terminal. The second terminal may determine whether to agree to establish the unicast connection with the first terminal based on the connection establishment associated information. The implementation is simple and the usability is high.

In embodiments of the present disclosure, the connection establishment admission message includes the temporary identifier allocated for the first terminal by the second terminal. The temporary identifier is configured to indicate the first terminal to schedule a transmission resource in a process of establishing the unicast connection with the second terminal, improving the security of terminal information in the process of establishing the unicast connection.

In embodiments of the present disclosure, when the first terminal receives the connection establishment rejection message carrying the target duration information returned by the second terminal, the first terminal may resend the connection establishment request message to the second terminal in response to the end of the target period. The target period refers to the time period lasting for the duration indicated by the target duration information and starting from the time point when the connection establishment rejection message is received. That is, the first terminal may not send the connection establishment request message to the second terminal again before the target period ends, thus reducing the occupation of transmission resources.

In embodiments of the present disclosure, the second terminal may determine whether to agree to establish the unicast connection with the first terminal after receiving the connection establishment request message for establishing the unicast connection with the second terminal from a first terminal. When agreeing to establish the unicast connection with the first terminal, the second terminal returns the connection establishment admission message to the first terminal. The unicast connection is established with the second terminal based on the connection establishment admission message by first terminal. The purpose of quickly establishing a unicast connection between two terminals based on sidelink is realized.

In embodiments of the present disclosure, the first terminal may send the connection establishment request message to the second terminal, and requests to establish the unicast connection with the second terminal through the connection establishment request message. The second terminal determines whether to agree to establish the unicast connection with the first terminal based on the connection establishment request message. Further, the first terminal may determine the strategy for data transmission with the second terminal based on the connection establishment message returned by the second terminal. The connection establishment message includes the connection establishment admission message or the connection establishment rejection message. In the above embodiments, the first terminal may determine the strategy for data transmission with the second terminal based on sidelink, which realizes the purpose of data transmission of establishing a unicast connection between terminals based on sidelink.

In embodiments of the present disclosure, when the connection establishment message includes the connection establishment admission message, the connection establishment admission message includes the temporary identifier allocated for the first terminal by the second terminal. The temporary identifier is configured to indicate the first terminal to schedule a transmission resource in the process of establishing the unicast connection based on sidelink. The first terminal may perform data transmission with the second terminal based on indication of the temporary identifier after obtaining the temporary identifier in the connection establishment admission message, realizing the purpose of data transmission of establishing a unicast connection between terminals based on sidelink.

In embodiments of the present disclosure, when the connection establishment message includes the connection establishment rejection message, the connection establishment rejection message may include the transmission indication message. The transmission indication message is configured to indicate the mode of data transmission between the first terminal and the second terminal. The first terminal performs data transmission with the second terminal based on the transmission indication message. It can also realize the purpose of data transmission of establishing a unicast connection between terminals based on sidelink.

In embodiments of the present disclosure, alternatively, the transmission indication message may include the redirection identifier and the target multicast address identifier. The first terminal may broadcast the target data to the second terminal based on the redirection identifier, or may send the target data to the group address corresponding to the target multicast address identifier. The target data refers to data to be sent to the second terminal by the first terminal. The purpose of data transmission of establishing a unicast connection between terminals based on sidelink is realized, ensuring the normal operation of the terminal business.

In embodiments of the present disclosure, the second terminal may determine whether to agree to establish the unicast connection with the first terminal after receiving the connection establishment request message sent by the first terminal, and returns the connection establishment message to the first terminal according to a determining result. The strategy for data transmission with the second terminal is determined by the first terminal based on the connection establishment message. The purpose of data transmission of establishing a unicast connection between terminals based on sidelink is realized.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this specification, illustrate embodiments consistent with the present disclosure and, together with the description, serve to explain the principles of the invention.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the present disclosure. Instead, they are merely examples of apparatuses and methods consistent with aspects related to the present disclosure as recited in the appended claims.

Terms used herein in the description of the present disclosure are only for the purpose of describing specific embodiments, but should not be construed to limit the present disclosure. As used in the description of the present disclosure and the appended claims, "a" and "the" in singular forms mean including plural forms, unless clearly indicated in the context otherwise. It should also be understood that, as used herein, the term "and/or" represents and contains any one and all possible combinations of one or more associated listed items.

It should be understood that, terms such as first, second or third may be used to describe various information but the information is not limited by the above terminologies. The above terminologies are used to distinguish one type of information from the other type of information, for example, first information may be referred to as second information without departing from a scope in accordance with the concept of the present disclosure and similarly, second information may be referred to as first information. As used herein, the term "if" may be construed to mean "when" or "upon" or "in response to determining" depending on the context.

Embodiments of the present disclosure provide a method for establishing a unicast connection and data transmission based on sidelink. The method of establishing a unicast connection based on sidelink is firstly described in the following.

The method for establishing a unicast connection based on sidelink provided in embodiments of the present disclosure is firstly described from a first terminal side.

Figure 1:
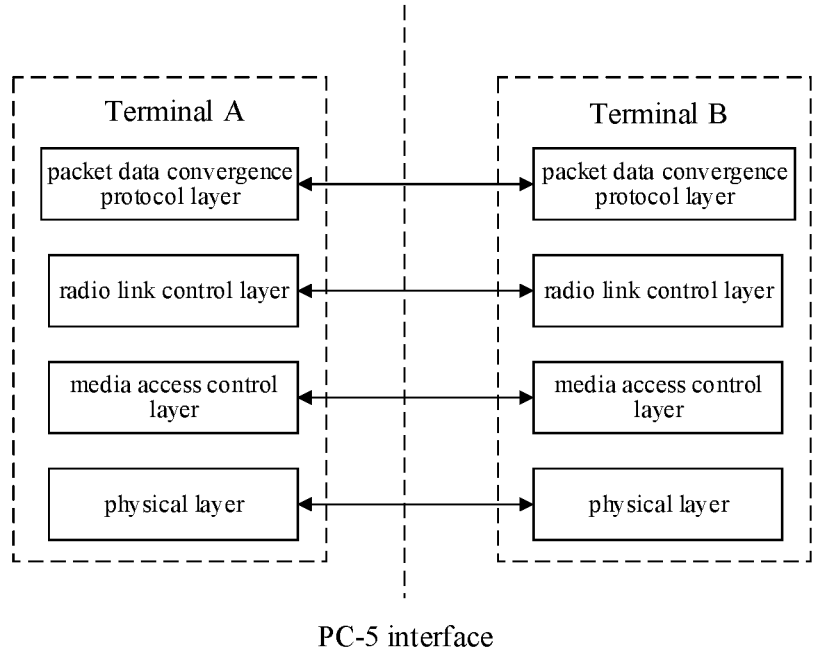
FIG. 1 is a schematic diagram illustrating a protocol stack based on sidelink in related art.
Figure 2:
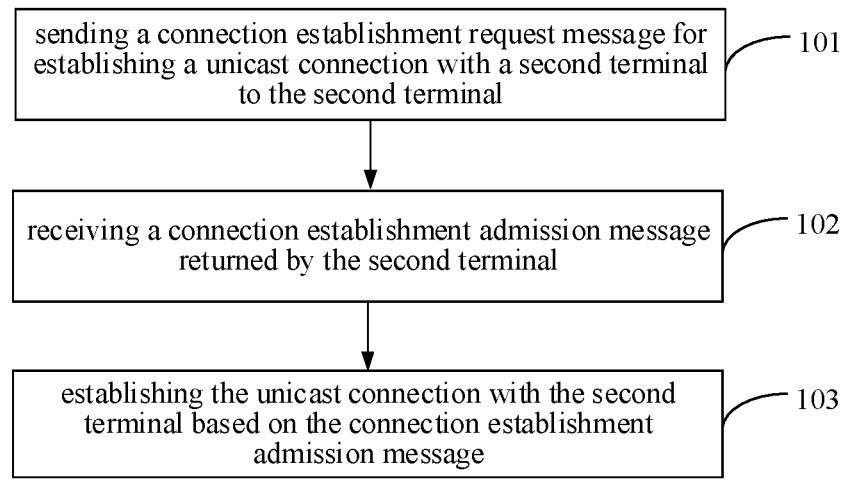
FIG. 2 is a flow chart showing a method for establishing a unicast connection based on sidelink according to an exemplary embodiment.

Embodiments of the present disclosure provide a method for establishing a unicast connection based on sidelink. The method may be applied to a first terminal. FIG. 2 is a flow chart showing a method for establishing a unicast connection based on sidelink according to an exemplary embodiment. As illustrated in FIG. 2, the method includes the following.

In step 101, a connection establishment request message for establishing a unicast connection with a second terminal is sent to the second terminal, for determining by the second terminal, whether to agree to establish the unicast connection with the first terminal based on the connection establishment request message.

In step 102, a connection establishment admission message returned by the second terminal is received.

In step 103, the unicast connection is established with the second terminal based on the connection establishment admission message.

In the above embodiments, the first terminal may send the connection establishment request message to the second terminal, and requests to establish the unicast connection with the second terminal through the connection establishment request message. The second terminal determines whether to agree to establish the unicast connection with the first terminal based on the connection establishment request message. The first terminal may establish the unicast connection with the second terminal based on the connection establishment admission message returned by the second terminal. Through the above process, a unicast connection between two terminals may be quickly established based on sidelink.

For the above step 101, alternatively, when the first terminal sends the connection establishment request message, a terminal identifier of the first terminal may be generated by an application layer of the first terminal, and the terminal identifier of the first terminal may be carried in the connection establishment request message. In addition, the connection establishment request message may further carry connection establishment associated information. The connection establishment associated information at least includes connection reason information configured to identify a connection reason for establishing the unicast connection with the second terminal. The reason for establishing the connection may be automatic driving, team driving, a rescue mission, and the like.

After receiving the connection establishment request message, the second terminal may determine whether to agree to establish the unicast connection with the first terminal based on the connection establishment associated information. Alternatively, the second terminal may also determine whether to agree to establish the unicast connection with the first terminal based on its own business volume in combination with the number of currently established unicast connections.

For the above step 102, the second terminal may return the connection establishment admission message to the first terminal when agreeing to establish the unicast connection with the first terminal, and the first terminal may directly receive the connection establishment admission message.

For the above step 103, the first terminal may establish the unicast connection with the second terminal base on a communication of sidelink.

Alternatively, the connection establishment admission message received by the first terminal may include a temporary identifier allocated for the first terminal by the second terminal. The temporary identifier is different from the terminal identifier of the first terminal. The first terminal may store the temporary identifier after obtaining the temporary identifier, so as to schedule a PDCCH (physical downlink control channel) resource for the first terminal based on indication of the temporary identifier, avoiding reveal of terminal information of the first terminal, and improving the security of terminal information in the process of establishing the unicast connection.

Figure 3:
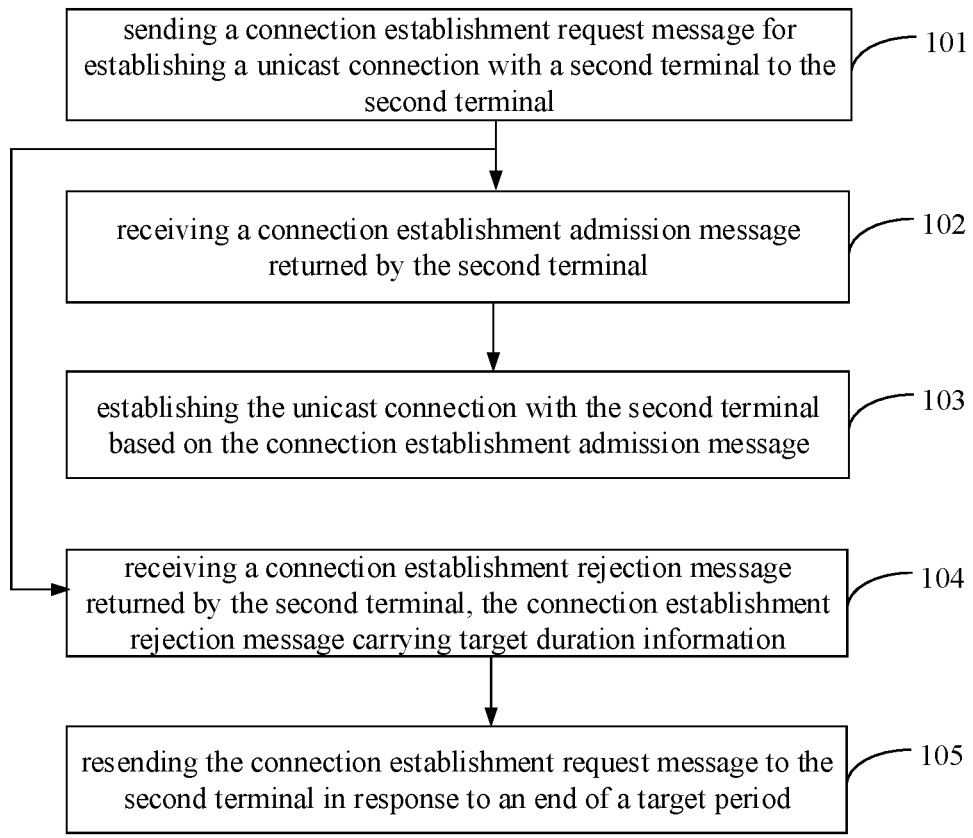
FIG. 3 is a flow chart showing a method for establishing a unicast connection based on sidelink according to another exemplary embodiment.

In an embodiment, FIG. 3 is a flow chart showing a method for establishing a unicast connection based on sidelink according to an embodiment shown in FIG. 2, as illustrated in FIG. 3, after the step 101 is implemented, the method for establishing a unicast connection based on sidelink may further include the following.

In step 104, a connection establishment rejection message returned by the second terminal is received, the connection establishment rejection message carrying target duration information.

In an embodiment of the present disclosure, the second terminal may send the connection establishment rejection message to the first terminal when disagreeing to establish the unicast connection with the first terminal. The connection establishment rejection message may carry the target duration information. A target duration indicated by the target duration information may be estimated by the second terminal based on a current business volume, which may be directly received by the first terminal.

In step 105, the connection establishment request message is resent to the second terminal in response to an end of a target period.

In this step, the first terminal may start timing at the time point when the connection establishment rejection message is received. When the timing duration reaches the target duration indicated by the target duration information, the timing is stopped and it is determined that the target period is ended. At this time, the first terminal may resend the connection establishment request message to the second terminal, and the second terminal determines whether to agree to establish the unicast connection with the first terminal again.

In the above embodiments, the first terminal may resend the connection establishment request message to the second terminal in response to the end of the target period. That is, the first terminal may not send the connection establishment request message to the second terminal again before the target period ends, thus reducing the occupation of transmission resources.

The method for establishing a unicast connection based on sidelink provided in embodiments of the present disclosure is further described from a second terminal side below.

Figure 4:
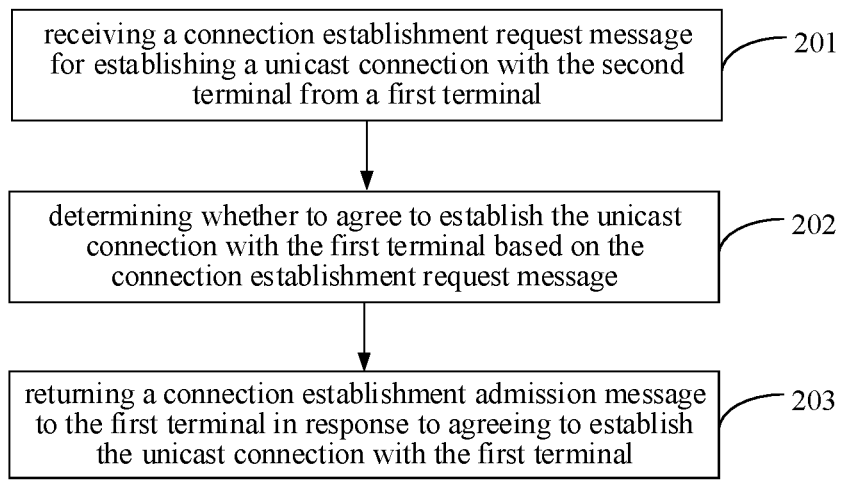
FIG. 4 is a flow chart showing a method for establishing a unicast connection based on sidelink according to an exemplary embodiment.

Embodiments of the present disclosure provide another method for establishing a unicast connection based on sidelink, which may be applied to a second terminal. FIG. 4 is a flow chart showing a method for establishing a unicast connection based on sidelink according to another exemplary embodiment. As illustrated in FIG. 4, the method may include the following.

In step 201, a connection establishment request message for establishing a unicast connection with the second terminal is received from a first terminal.

In step 202, it is determined whether to agree to establish the unicast connection with the first terminal based on the connection establishment request message.

In step 203, a connection establishment admission message is returned to the first terminal in response to agreeing to establish the unicast connection with the first terminal, the first terminal establishing the unicast connection with the second terminal based on the connection establishment admission message.

In the above embodiments, the second terminal may determine whether to agree to establish the unicast connection with the first terminal after receiving the connection establishment request message for establishing the unicast connection with the second terminal from a first terminal. When agreeing to establish the unicast connection with the first terminal, the second terminal returns the connection establishment admission message to the first terminal. The unicast connection is established with the second terminal based on the connection establishment admission message by first terminal. The purpose of quickly establishing a unicast connection between two terminals based on sidelink is realized.

For the above step 201, the second terminal may directly receive the connection establishment request message sent by the first terminal. Alternatively, the connection establishment request message carries a terminal identifier of the first terminal and connection establishment associated information. The connection establishment associated information at least includes connection reason information configured to identify a connection reason for establishing the unicast connection with the second terminal.

For the above step 202, the second terminal may determine whether to agree to establish the unicast connection with the first terminal based on the connection establishment associated information included in the connection establishment request message.

For example, when the connection reason information indicates that the connection reason is the team driving, the second terminal may reject to establish the unicast connection with the first terminal. Alternatively, when the connection reason information indicates that the connection reason is the rescue mission, the second terminal may agree to establish the unicast connection with the first terminal.

Alternatively, the second terminal may determine whether to agree to establish the unicast connection with the first terminal based on current business volume in combination with the number of established unicast connections.

For example, when the second terminal is currently under a heavy load, the second terminal may disagree to establish the unicast connection with the first terminal. Alternatively, the second terminal may preset a maximum number of established unicast connections. When the number of currently established unicast connections reaches the maximum number, the second terminal may disagree to establish the unicast connection when the connection reason indicated by the connection reason information is the team driving.

Certainly, the connection establishment associated information may further include other information, which is not limited in the present disclosure.

For the above step 203, the second terminal may return the connection establishment admission message to the first terminal when agreeing to establish the unicast connection with the first terminal, so that the first terminal establishes the unicast connection with the second terminal based on the establishment admission message.

Figure 5:
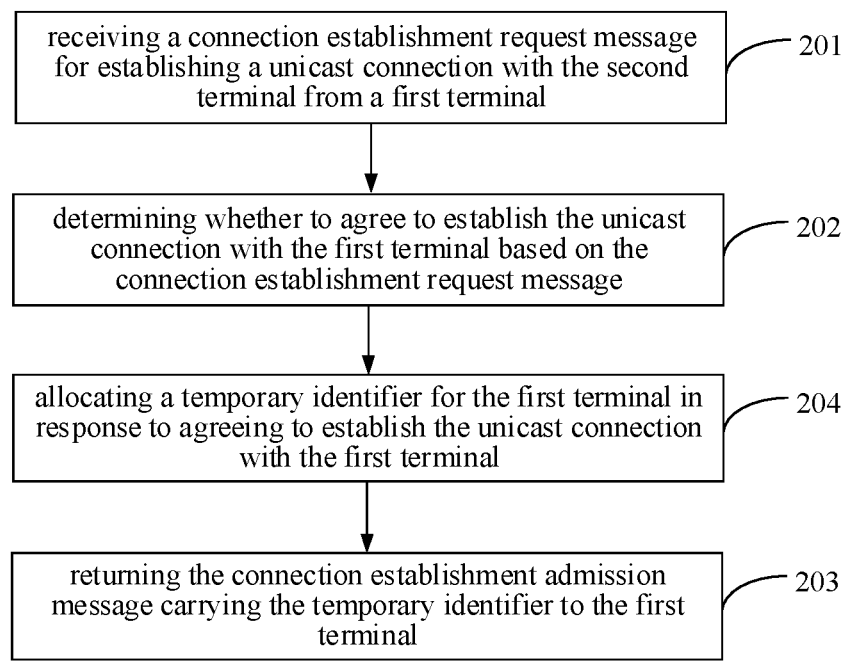
FIG. 5 is a flow chart showing a method for establishing a unicast connection based on sidelink according to another exemplary embodiment.

In an embodiments, FIG. 5 is a flow chart showing a method for establishing a unicast connection based on sidelink according to an exemplary embodiment shown in FIG. 4. As illustrated in FIG. 5, the above method for establishing a unicast connection based on sidelink may further include the following.

In step 204, a temporary identifier is allocated for the first terminal in response to agreeing to establish the unicast connection with the first terminal.

In this step, the second terminal may allocate the temporary identifier for the first terminal when the second terminal agrees to establish the unicast connection with the first terminal. The temporary identifier is configured to indicate the first terminal to schedule a transmission resource in a process of establishing the unicast connection with the second terminal. In addition, in order to avoid reveal of information of the first terminal and to improve the security of the sidelink communication, the temporary identifier allocated by the second terminal may be different from the terminal identifier of the first terminal.

Alternatively, the step 203 may be as following.

The connection establishment admission message carrying the temporary identifier is returned to the first terminal.

In this way, the first terminal may control the resource schedule of PDCCH based on the temporary identifier during subsequent unicast connection which is based on the sidelink communication process.

In the above embodiments, after the unicast connection is successfully established, the first terminal may schedule transmission resources based on the temporary identifier, improving the security of terminal information in the process of establishing the unicast connection.

Figure 6:
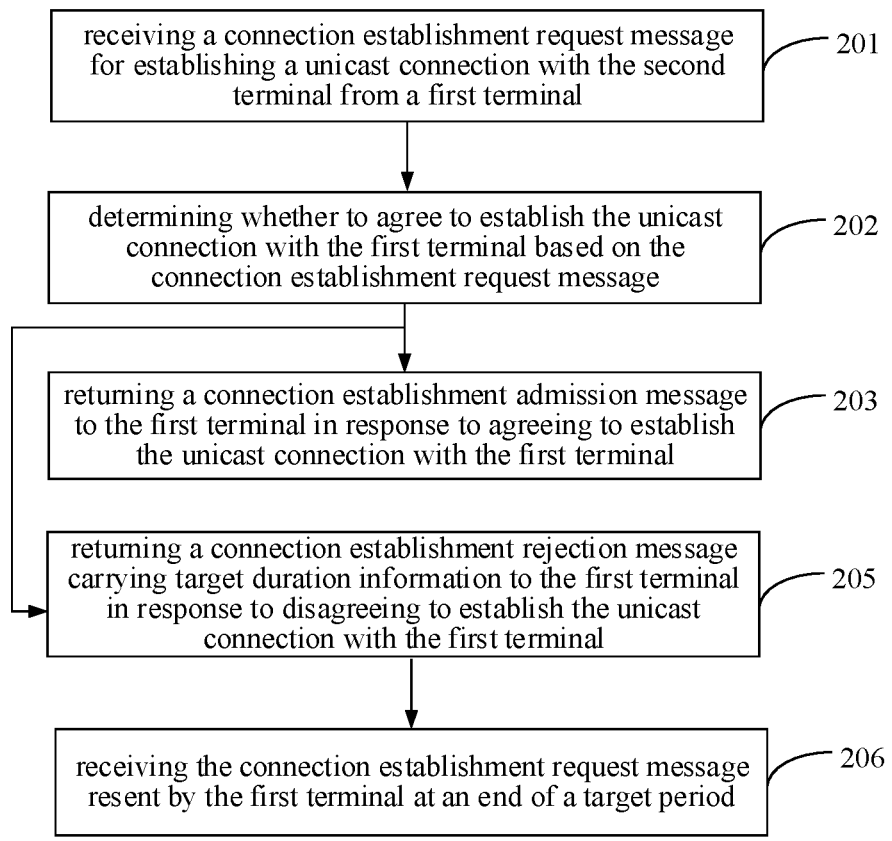
FIG. 6 is a flow chart showing a method for establishing a unicast connection based on sidelink according to an exemplary embodiment.

In an embodiment, FIG. 6 is a flow chart showing another method for establishing a unicast connection based on sidelink according to an exemplary embodiment shown in FIG. 4. As illustrated in FIG. 6, the method for establishing a unicast connection based on sidelink may further include the following.

In step 205, a connection establishment rejection message carrying target duration information is returned to the second terminal in response to disagreeing to establish the unicast connection with the first terminal.

In this step, when the second terminal determines to disagree to establish the unicast connection with the first terminal based on the connection establishment associated information, the current business volume and the number of established unicast connections, the second terminal may return the connection establishment rejection message to the first terminal, to facilitate the first terminal to know that the second terminal refuses to establish the unicast connection.

Alternatively, the connection establishment rejection message may carry target duration information. The second terminal may estimate a target duration according to its own business volume. For example, the second terminal currently establishes a unicast connection with a third terminal, and data transmission is expected to be completed in 10 minutes, thus the second terminal may determine the target duration as 10 minutes.

Further, the second terminal sends the target duration information to the first terminal through the connection establishment rejection message.

In step 206, the connection establishment request message resent by the first terminal at an end of a target period is received. The target period refers to a time period lasting for a duration indicated by the target duration information and starting from a time point when the connection establishment rejection message is received.

In an embodiment of the present disclosure, the first terminal may determine the target period according to the target duration information, and resend the connection establishment request message to the second terminal at the end of the target period. After receiving the connection establishment request message, the second terminal may determine whether to agree to establish the unicast connection with the first terminal again in the same manner as in the above step 202.

In the above embodiments, when the second disagrees to establish the unicast connection with the first terminal, the second terminal may return the connection establishment rejection message carrying the target duration information to the first terminal, so that the first terminal may not send the connection establishment request message to the second terminal again before the target period ends, thus reducing the occupation of transmission resources.

Figure 7:
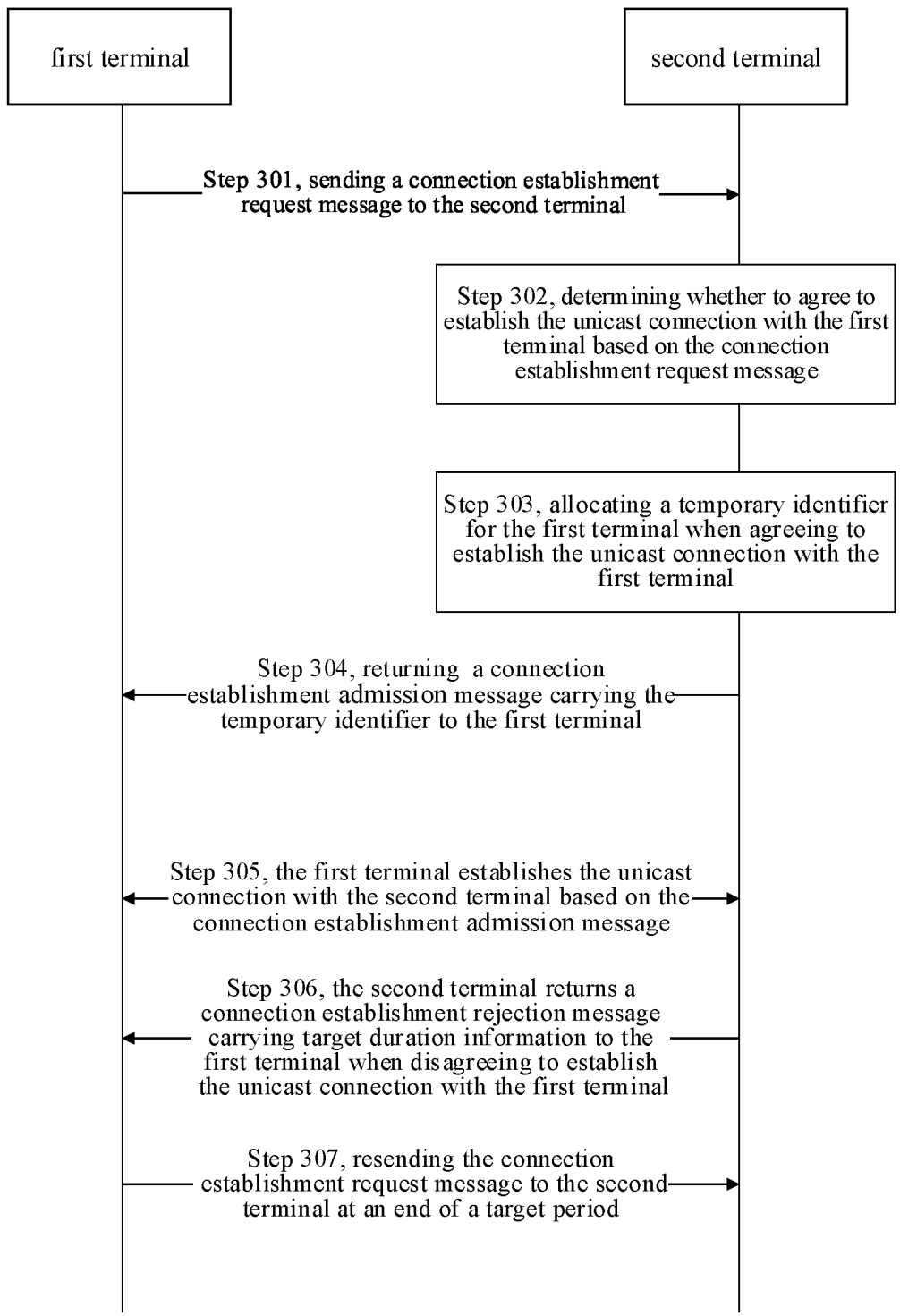
FIG. 7 is a flow chart showing a method for establishing a unicast connection based on sidelink according to another exemplary embodiment.

In an embodiment, FIG. 7 is a flow chart showing a method for establishing a unicast connection based on sidelink according to another exemplary embodiment. As illustrated in FIG. 7, the method may include the following.

In step 301, a first terminal sends a connection establishment request message to the second terminal.

The connection establishment request message carries a terminal identifier of the first terminal and connection establishment associated information. The connection establishment associated information at least includes connection reason information configured to identify a connection reason for establishing the unicast connection with the second terminal.

In step 302, the second terminal determines whether to agree to establish the unicast connection with the first terminal based on the connection establishment request message.

In step 303, the second terminal allocates a temporary identifier for the first terminal in response to agreeing to establish the unicast connection with the first terminal.

Alternatively, the temporary identifier is configured to indicate the first terminal to schedule a transmission resource in a process of establishing the unicast connection with the second terminal.

In step 304, the second terminal returns a connection establishment admission message carrying the temporary identifier to the first terminal.

In step 305, the first terminal establishes the unicast connection with the second terminal based on the connection establishment admission message.

In step 306, the second returns a connection establishment rejection message carrying target duration information to the first terminal in response to disagreeing to establish the unicast connection with the first terminal.

In step 307, the first terminal resends the connection establishment request message to the second terminal at an end of a target period.

The target period refers to a time period lasting for a duration indicated by the target duration information and starting from a time point when the connection establishment rejection message is received.

For example, the above embodiments are further illustrated as follows.

Example 1

Terminal 1 wants to drive automatically, so terminal 1 decides to establish a unicast connection with terminal 2 based on a sidelink communication to send relevant data.

Terminal 1 generates a connection establishment request message carrying a terminal identifier of terminal 1. The terminal identifier is generated by an application layer of terminal 1, and is configured to identify terminal 1 in the sidelink communication. In addition, the connection establishment request message may further carry connection establishment associated information. A connection reason indicated by connection reason information included in the connection establishment associated information is automatic driving. Further, terminal 1 sends the connection establishment request message to terminal 2.

After receiving the connection establishment request message, terminal 2 determines whether to agree to establish the unicast connection with terminal 1 based on the terminal identifier of terminal 1 and a connection establishment reason.

When terminal 2 agrees to establish the unicast connection, terminal 2 may return a connection establishment admission message carrying a temporary identifier to terminal 1. Terminal 1 stores the temporary identifier for subsequent scheduling of transmission resources, i.e., receiving of PDCCH resource.

When terminal 2 disagrees to establish the unicast connection, terminal 2 may return a connection establishment rejection message carrying target duration information to terminal 1.

Terminal 1 may not send the connection establishment request message to terminal 2 again before a target period ends, and may send the connection establishment request message to terminal 2 again at the end of the target period.

In the above embodiments, when the second terminal agrees to establish the unicast connection with the first terminal, the second terminal returns the connection establishment admission message to the first terminal. The first terminal may establish the unicast connection with the second terminal based on the connection establishment admission message, realizing a purpose of quickly establishing a unicast connection between two terminals based on sidelink. When the second terminal disagrees to establish the unicast connection with the first terminal, the target duration information may be carried in the connection establishment rejection message. The first terminal sends the connection establishment request message to the second terminal again at the end of the target period. That is, the first terminal may not send the connection establishment request message to the second terminal again before the target period ends, thus reducing the occupation of transmission resources.

A method for data transmission and establishing a unicast connection based on sidelink will be described below.

In the data transmission method provided in some embodiments of the present disclosure, when a sidelink-based unicast connection is established between the first terminal and the second terminal according to the method provided in the above embodiment, the data transmission may be directly performed through the unicast connection.

In some embodiments of the present disclosure, when a sidelink-based unicast connection cannot be established between the first terminal and the second terminal, the first terminal may send a connection establishment request message for establishing a unicast connection with the second terminal to the second terminal as described in the step 101 in the above process of establishing the unicast connection. Since the unicast connection cannot be established with the second terminal, in order to ensure the data transmission, the first terminal may determine a strategy for data transmission with the second terminal based on a connection establishment message returned by the second terminal, so that the data transmission may still be performed when the unicast connection cannot be established with the second terminal, ensuring normal use of the business.

The method for data transmission and establishing a unicast connection based on sidelink provided in embodiments of the present disclosure is described from a first terminal side.

Figure 8:
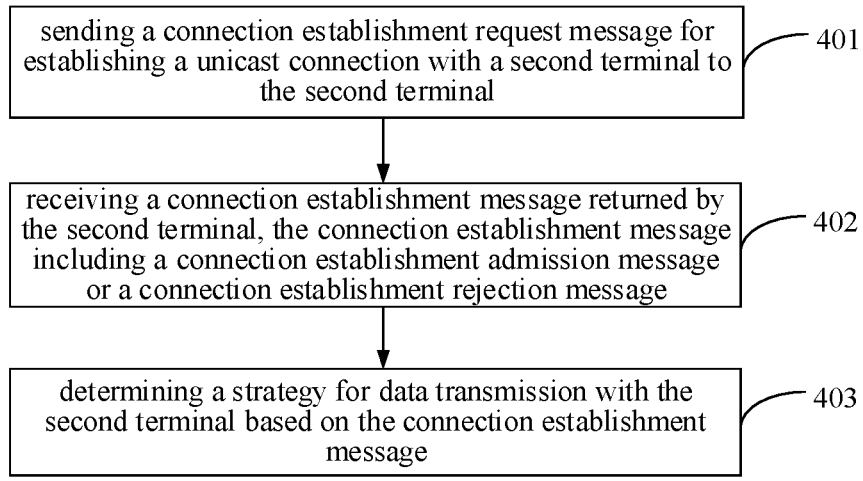
FIG. 8 is a flow chart showing a method for establishing a unicast connection based on sidelink according to an exemplary embodiment.

Embodiments of the present disclosure provide a method for data transmission and establishing a unicast connection based on sidelink. The method may be applied to a first terminal. FIG. 8 is a flow chart showing a method for establishing a unicast connection based on sidelink according to an exemplary embodiment. As illustrated in FIG. 8, the method may include the following.

In step 401, a connection establishment request message for establishing a unicast connection with a second terminal is sent to the second terminal, the second terminal determining whether to agree to establish the unicast connection with the first terminal based on the connection establishment request message.

In step 402, a connection establishment message returned by the second terminal is received, the connection establishment message including a connection establishment admission message or a connection establishment rejection message.

In step 403, a strategy for data transmission with the second terminal is determined based on the connection establishment message.

In the above embodiments, the first terminal may send the connection establishment request message to the second terminal, to request to establish the unicast connection with the second terminal via the connection establishment request message. The second terminal determine whether to agree to establish the unicast connection with the first terminal based on the connection establishment request message. Further, the first terminal may determine the strategy for data transmission with the second terminal based on the connection establishment message returned by the second terminal. The connection establishment message includes a connection establishment admission message or a connection establishment rejection message. In the above embodiments, the first terminal may determine the strategy for data transmission with the second terminal based on sidelink, realizing a purpose of data transmission and establishing a unicast connection based on sidelink between terminals.

For the above step 401, in some embodiments of the present disclosure, the step 401 is the same as the step 101 for establishing the unicast connection, in which, a connection establishment request message may be sent to the second terminal by the first terminal.

Alternatively, when the first terminal sends the connection establishment request message, a terminal identifier of the first terminal may be generated by an application layer of the first terminal, and the terminal identifier of the first terminal may be carried in the connection establishment request message. In addition, the connection establishment request message may further carry connection establishment associated information. The connection establishment associated information at least includes connection reason information configured to identify a connection reason for establishing the unicast connection with the second terminal. The reason for establishing the connection may be automatic driving, team driving, a rescue mission, and the like.

After receiving the connection establishment request message, the second terminal may determine whether to agree to establish the unicast connection with the first terminal based on the connection establishment associated information. Alternatively, the second terminal may also determine whether to agree to establish the unicast connection with the first terminal based on its own business volume in combination with the number of currently established unicast connections.

For the above step 402, the first terminal may receive the connection establishment message returned by the second terminal. When the second terminal agrees to establish the unicast connection with the first terminal, the first terminal may receive the connection establishment admission message, and may further determine, based on the connection establishment admission message, to perform data transmission through the unicast connection established with the second terminal. When the second terminal disagrees to establish the unicast connection with the first terminal, the first terminal may receive the connection establishment rejection message, and may further determine a strategy for data transmission with the second terminal based on a transmission indication message carried in the connection establishment rejection message For the above step 403, the first terminal may determine the strategy used when the data transmission with the second terminal is performed based on the connection establishment message received in the step 402.

In an embodiment, when the connection establishment message includes the connection establishment admission message, it indicates that the second terminal agrees to establish the unicast connection with the first terminal. Thus, the first terminal may firstly establish the unicast connection with the second terminal, and then performs the data transmission through the established unicast connection.

Figure 9:
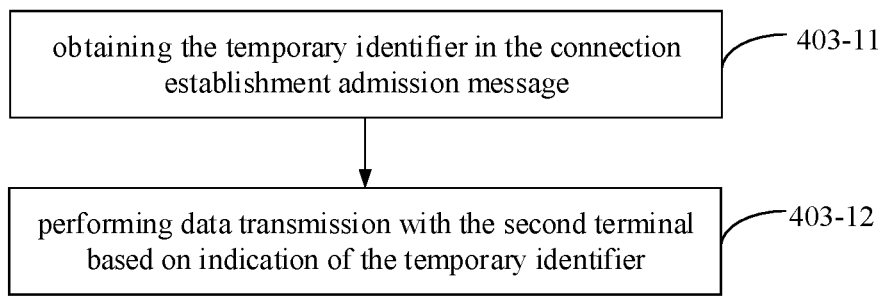
FIG. 9 is a flow chart showing a method for establishing a unicast connection based on sidelink according to another exemplary embodiment.

Alternatively, the connection establishment admission message includes a temporary identifier allocated for the first terminal by the second terminal. FIG. 9 is a flow chart showing a method for establishing a unicast connection based on sidelink according to an exemplary embodiment shown in FIG. 8. As shown in FIG. 9, the above step 403 may include the following.

In step 403-11, the temporary identifier in the connection establishment admission message is obtained.

In this step, the first terminal may obtain the temporary identifier allocated for the first terminal by the second terminal in the connection establishment admission message. In order to ensure security of information of the terminal, the temporary identifier is different from the terminal identifier of the first terminal.

In step 403-12, data transmission with the second terminal is performed based on indication of the temporary identifier.

In this step, after obtaining the temporary identifier, the first terminal may store temporary identifier, so as to schedule a PDCCH resource for the first terminal based on the indication of the temporary identifier, thus allowing the first terminal to send target data that needs to be sent to the second terminal to the second terminal. This realizes a purpose of data transmission and establishing the unicast connection between the first terminal and the second terminal based on sidelink.

In an embodiment, when the connection establishment message includes the connection establishment rejection message, it indicates that the second terminal disagrees to establish the unicast connection with the first terminal. In some embodiments, a transmission indication message may be included in the connection establishment rejection message. The transmission indication message is configured to indicate a mode of data transmission between the first terminal and the second terminal.

Figure 10:
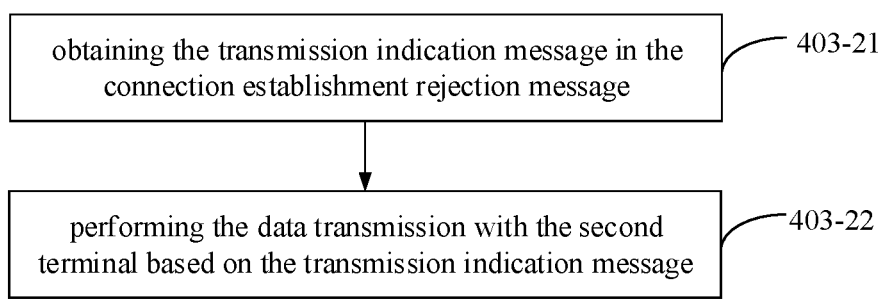
FIG. 10 is a flow chart showing a method for establishing a unicast connection based on sidelink according to an exemplary embodiment.

Correspondingly, FIG. 10 is a flow chart showing a method for establishing a unicast connection based on sidelink according to an exemplary embodiment shown in FIG. 8. As illustrated in FIG. 10, the above step 403 may include the following.

In step 403-21, the transmission indication message in the connection establishment rejection message is obtained.

In this step, the first terminal may read the transmission indication message carried in a specified field in the connection establishment rejection message. Alternatively, the transmission indication message may include a redirection identifier or a target multicast address identifier. The target multicast address identifier refers to a group address identifier of a group where the second terminal is located.

In step 403-22, the data transmission with the second terminal is performed based on the transmission indication message.

In this step, when the transmission indication message includes the redirection identifier, the first terminal may send the target data to the second terminal in a broadcast way. The target data refers to data to be sent to the second terminal by the first terminal.

When the transmission indication message includes the target multicast address identifier, the first terminal may send the target data to a group address corresponding to the target multicast address identifier. It can also be ensured that the second terminal can receive the target data.

In the above embodiments, alternatively, the transmission indication message may include the redirection identifier or the target multicast address identifier. The first terminal may broadcast the target data to the second terminal based on the redirection identifier, or send the target data to the group address corresponding to the target multicast address identifier. The target data refers to data to be sent to the second terminal by the first terminal. This realizes the purpose of data transmission and establishing the unicast connection between terminals based on sidelink, and ensures the normal operation of the terminal business.

The method for data transmission and establishing a unicast connection based on sidelink provided in embodiments of the present disclosure is described from a second terminal side.

Figure 11:
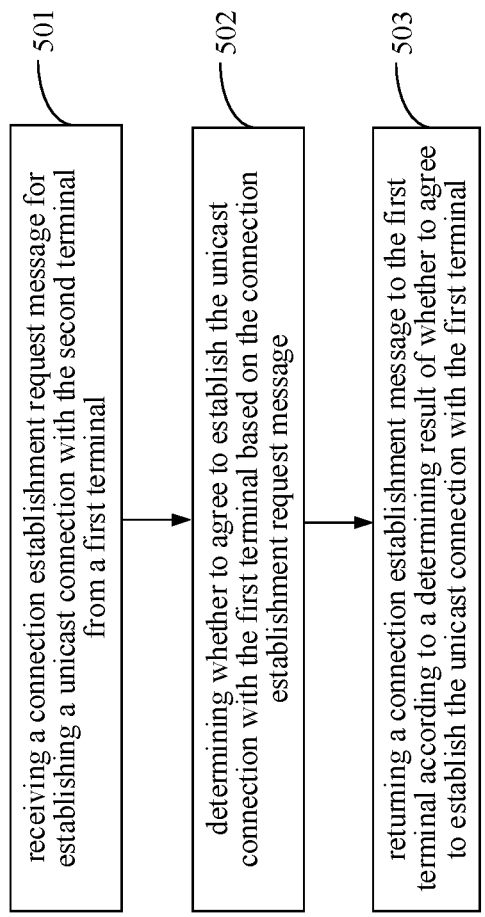
FIG. 11 is a flow chart showing a method for establishing a unicast connection based on sidelink according to another exemplary embodiment.

Embodiments of the present disclosure provide a method for data transmission and establishing a unicast connection based on sidelink. The method may be applied to a second terminal. FIG. 11 is a flow chart showing a method for data transmission and establishing a unicast connection based on sidelink according to another exemplary embodiment. As illustrated in FIG. 11, the method may include the following.

In step 501, a connection establishment request message for establishing a unicast connection with the second terminal sent by a first terminal is received.

In step 502, it is determined whether to agree to establish the unicast connection with the first terminal based on the connection establishment request message.

In step 503, a connection establishment message is returned to the first terminal according to a determining result of whether to agree to establish the unicast connection with the first terminal, the connection establishment message including a connection establishment admission message or a connection establishment rejection message, the first terminal determining a strategy for data transmission with the second terminal based on the connection establishment message.

In the above embodiments, the second terminal may determine whether to agree to establish the unicast connection with the first terminal after receiving the connection establishment request message sent by the first terminal, and may return the connection establishment message to the first terminal according to the determining result. The strategy for data transmission with the second terminal is determined based on the connection establishment message by the first terminal, realizing the purpose of data transmission and establishing the unicast connection between terminals based on sidelink.

For the above step 501, the second terminal may directly receive the connection establishment request message sent by the first terminal. Alternatively, a terminal identifier of the first terminal and connection establishment associated information are carried in the connection establishment request message. The connection establishment associated information at least includes connection reason information configured to identify a connection reason for establishing the unicast connection with the second terminal.

For the above step 502, the second terminal may determine whether to agree to establish the unicast connection with the first terminal based on the connection establishment associated information included in the connection establishment request message.

For example, when the connection reason information indicates that the connection reason is the team driving, the second terminal may reject to establish the unicast connection with the first terminal. Alternatively, when the connection reason information indicates that the connection reason is the rescue mission, the second terminal may agree to establish the unicast connection with the first terminal.

Alternatively, the second terminal may determine whether to agree to establish the unicast connection with the first terminal based on current business volume in combination with the number of established unicast connections.

For example, when the second terminal is currently under a heavy load, the second terminal may disagree to establish the unicast connection with the first terminal. Alternatively, the second terminal may preset a maximum number of established unicast connections. When the number of currently established unicast connections reaches the maximum number, the second terminal may disagree to establish the unicast connection when the connection reason indicated by the connection reason information is the team driving.

Certainly, the connection establishment associated information may further include other information, which is not limited in the present disclosure.

For the above step 503, the second terminal may return different connection establishment messages to the first terminal according to the determining result of the step 502.

In an embodiment, when the determining result is that the second terminal agrees to establish the unicast connection with the first terminal, the connection establishment admission message is returned to the first terminal. The connection establishment admission message may include a temporary identifier allocated for the first terminal by the second terminal. And then, the first terminal may schedule a transmission resource based on the temporary identifier in the process of establishing the unicast connection based on sidelink.

In an embodiment, when the determining result is that the second terminal disagrees to establish the unicast connection with the first terminal, the connection establishment rejection message is returned to the first terminal.

In some embodiments of the present disclosure, in order to ensure normal operation of terminal business, a transmission indication message may be carried in the connection establishment rejection message when the second terminal disagrees to establish the unicast connection with the first terminal, so as to indicate a mode of data transmission between the first terminal and the second terminal.

In an embodiment, alternatively, the transmission indication message includes a redirection identifier. The first terminal may directly broadcast target data to the second terminal based on the redirection identifier, and the target data refers to data to be sent to the second terminal.

In the above embodiments, a purpose of establishing a unicast connection and data transmission based on sidelink is realized, and the normal operation of terminal business is ensured.

In an embodiment, alternatively, the transmission indication message includes a target multicast address identifier. The second terminal may take a group address identifier of a group where the second terminal is located as the target multicast address identifier, and may send it to the first terminal via the connection establishment rejection message. After receiving the target multicast address identifier, the first terminal may send the target data to the group address corresponding to the target multicast address identifier. Thus, it ensured that the second terminal can receive the target data.

In the above embodiments, the purpose of establishing a unicast connection and data transmission based on sidelink is also realized, and the normal operation of terminal business is ensured.

Figure 12:
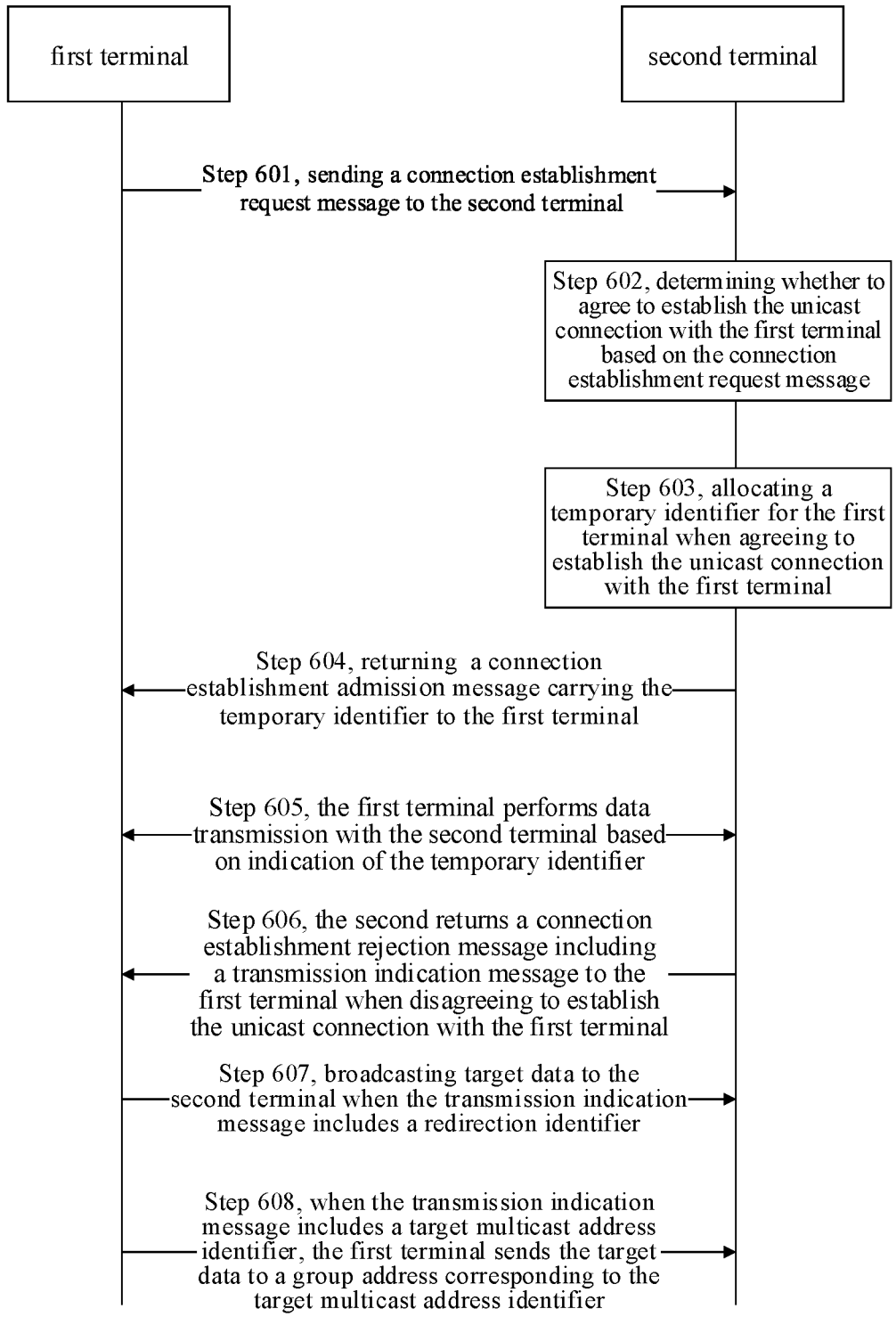
FIG. 12 is a flow chart showing a method for establishing a unicast connection based on sidelink according to another exemplary embodiment.

In an embodiment, FIG. 12 is a flow chart showing a method for establishing a unicast connection based on sidelink according to another exemplary embodiment. As illustrated in FIG. 12, the method may include the following.

In step 601, the first terminal sends a connection establishment request message to a second terminal.

The connection establishment request message carries a terminal identifier of the first terminal and connection establishment associated information. The connection establishment associated information at least includes connection reason information configured to identify a connection reason for requesting to establish the unicast connection with the second terminal.

In step 602, the second terminal determines whether to agree to establish the unicast connection with the first terminal based on the connection establishment request message.

In step 603, the second terminal allocates a temporary identifier for the first terminal in response to agreeing to establish the unicast connection with the first terminal.

Alternatively, the temporary identifier is different from the terminal identifier of the first terminal.

In step 604, the second terminal returns a connection establishment admission message carrying the temporary identifier to the first terminal.

In step 605, the first terminal performs data transmission with the second terminal based on indication of the temporary identifier In step 606, the second returns a connection establishment rejection message including a transmission indication message to the first terminal in response to disagreeing to establish the unicast connection with the first terminal.

In step 607, the first terminal broadcast target data to the second terminal when the transmission indication message includes a redirection identifier.

The target data is data that the first terminal needs to send to the second terminal.

In step 608, when the transmission indication message includes a target multicast address identifier, the first terminal sends the target data to a group address corresponding to the target multicast address identifier.

For example, the above embodiments are further illustrated as follows.

Example 2

Terminal 1 wants to drive automatically, so terminal 1 decides to establish a unicast connection with terminal 2 based on a sidelink communication to send relevant data.

Terminal 1 generates a connection establishment request message carrying a terminal identifier of terminal 1. The terminal identifier is generated by an application layer of terminal 1, and is configured to identify terminal 1 in the sidelink communication. In addition, the connection establishment request message may further carry connection establishment associated information. A connection reason indicated by connection reason information included in the connection establishment associated information is automatic driving. Further, terminal 1 sends the connection establishment request message to terminal 2.

After receiving the connection establishment request message, terminal 2 determines whether to agree to establish the unicast connection with terminal 1 based on the terminal identifier of terminal 1 and the connection establishment associated information.

When terminal 2 agrees to establish the unicast connection, terminal 2 may return a connection establishment admission message carrying a temporary identifier to the first terminal. The first terminal stores the temporary identifier. And then, the first terminal may perform PDCCH resource schedule based on an indication of the temporary identifier, so as to perform data transmission with the second terminal.

When terminal 2 disagrees to establish the unicast connection, terminal 2 may return a connection establishment rejection message including a redirection identifier or a target multicast address identifier to terminal 1.

After receiving the connection establishment rejection message, terminal 1 sends target data that needs to be sent to terminal 2 through broadcasting, or terminal 1 sends the target data to a group address corresponding to the target multicast address identifier.

In the above embodiments, when the second terminal agrees to establish the unicast connection with the first terminal, the second terminal returns the connection establishment admission message to the first terminal. The first terminal may perform data transmission with the second terminal based on the temporary identifier in the connection establishment admission message. When the second terminal disagrees to establish the unicast connection with the first terminal, the first terminal may receive the connection establishment rejection message returned by the second terminal. When the connection establishment rejection message includes the redirection identifier or the target multicast address identifier, the first terminal may directly broadcast the target data to the second terminal or may send the target data to the group address corresponding to the target multicast address identifier. Thus, the target data may be sent to the second terminal in a broadcasting way when the unicast connection cannot be established with the second terminal, realizing a purpose of establishing a unicast connection and data transmission based on sidelink between terminals, and ensuring the normal operation of the business.

Corresponding to the above-mentioned embodiments of the application function realization method, the present disclosure also provides embodiments of an application function realization apparatus and a corresponding terminal.

Figure 13:
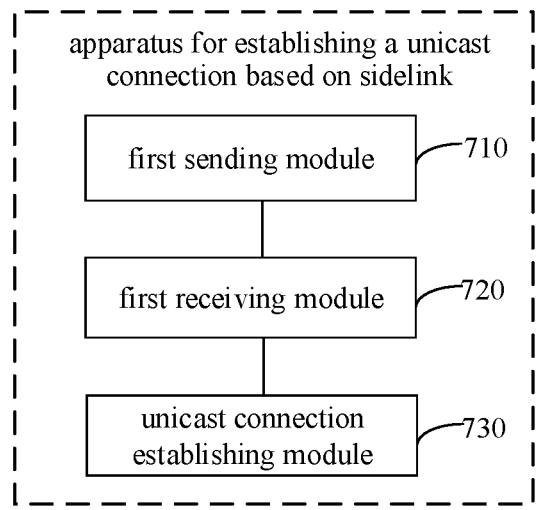
FIG. 13 is a block diagram illustrating an apparatus for establishing a unicast connection based on sidelink according to an exemplary embodiment.

As illustrated in FIG. 13, FIG. 13 is a block diagram illustrating an apparatus for establishing a unicast connection based on sidelink according to an exemplary embodiment. The apparatus is applied to a first terminal. The apparatus may include a first sending module 710, a first receiving module 720, and a connection establishing module 730.

The first sending module 710 is configured to send a connection establishment request message for establishing a unicast connection with a second terminal to the second terminal, for determining by the second terminal, whether to agree to establish the unicast connection with the first terminal based on the connection establishment request message.

The first receiving module 720 is configured to receive a connection establishment admission message returned by the second terminal.

The connection establishing module 730 is configured to establish the unicast connection with the second terminal based on the connection establishment admission message.

Alternatively, the connection establishment request message carries a terminal identifier of the first terminal and connection establishment associated information. The connection establishment associated information at least includes connection reason information configured to identify a connection reason for establishing the unicast connection with the second terminal.

Alternatively, the connection establishment admission message includes a temporary identifier allocated for the first terminal by the second terminal. The temporary identifier is configured to indicate the first terminal to schedule a transmission resource in a process of establishing the unicast connection with the second terminal.

Figure 14:
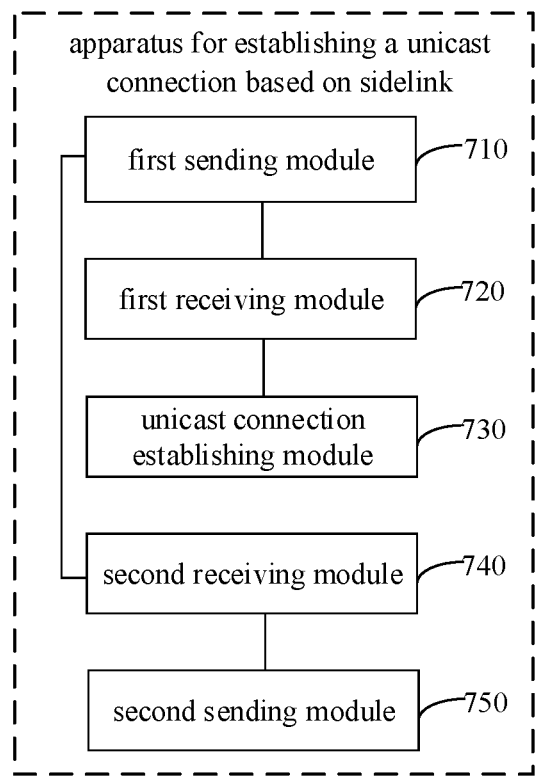
FIG. 14 is a block diagram illustrating an apparatus for establishing a unicast connection based on sidelink according to another exemplary embodiment.

As illustrated in FIG. 14, FIG. 14 is another block diagram illustrating an apparatus for establishing a unicast connection based on sidelink on the basis of the embodiment shown in FIG. 13, the apparatus further includes: a second receiving module 740 and a second sending module 750.

The second receiving module 740 is configured to receive a connection establishment rejection message returned by the second terminal, the connection establishment rejection message carrying target duration information.

The second sending module 750 is configured to resend the connection establishment request message to the second terminal in response to an end of a target period.

The target period refers to a time period lasting for a duration indicated by the target duration information and starting from a time point when the connection establishment rejection message is received.

Figure 15:
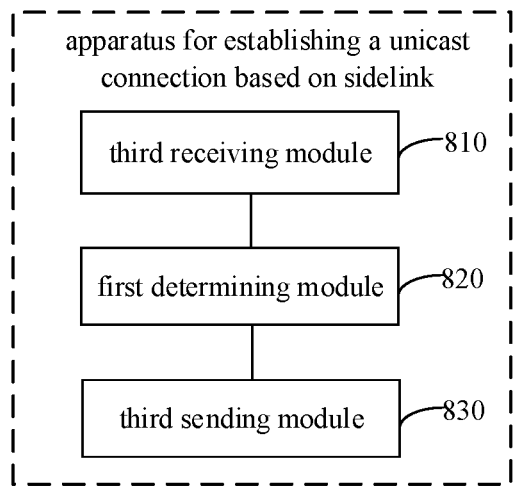
FIG. 15 is a block diagram illustrating an apparatus for establishing a unicast connection based on sidelink according to another exemplary embodiment.

As illustrated in FIG. 15, FIG. 15 is a block diagram illustrating an apparatus for establishing a unicast connection based on sidelink according to an exemplary embodiment. The apparatus is applied to a second terminal. The apparatus includes a third receiving module 810, a first determining module 820, and a third sending module 830.

The third receiving module 810 is configured to receive a connection establishment request message for establishing a unicast connection with the second terminal from a first terminal.

The first determining module 820 is configured to determine whether to agree to establish the unicast connection with the first terminal based on the connection establishment request message.

The third sending module 830 is configured to return a connection establishment admission message to the first terminal in response to agreeing to establish the unicast connection with the first terminal, the first terminal establishing the unicast connection with the second terminal based on the connection establishment admission message.

Alternatively, the connection establishment request message carries a terminal identifier of the first terminal and connection establishment associated information. The connection establishment associated information at least includes connection reason information configured to identify a connection reason for establishing the unicast connection with the second terminal.

Figure 16:
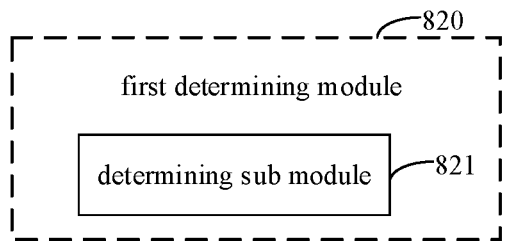
FIG. 16 is a block diagram illustrating an apparatus for establishing a unicast connection based on sidelink according to another exemplary embodiment.

As illustrated in FIG. 16, FIG. 16 is another block diagram illustrating an apparatus for establishing a unicast connection based on sidelink on the basis of the embodiment shown in FIG. 15. The first determining module 820 includes a determining sub module 821.

The determining sub module 821 is configured to determine whether to agree to establish the unicast connection with the first terminal based on the connection establishment associated information.

Figure 17:
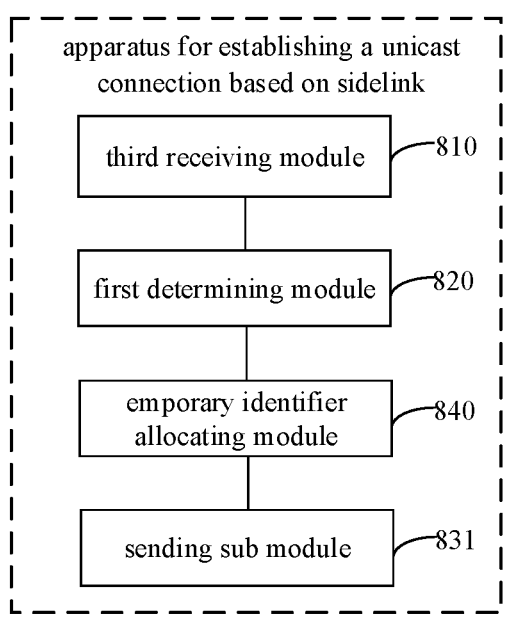
FIG. 17 is a block diagram illustrating an apparatus for establishing a unicast connection based on sidelink according to another exemplary embodiment.

As illustrated in FIG. 17, FIG. 17 is another block diagram illustrating an apparatus for establishing a unicast connection based on sidelink on the basis of the embodiment shown in FIG. 15. The apparatus further includes a temporary identifier allocating module 840.

The temporary identifier allocating module 840 is configured to allocate a temporary identifier for the first terminal in response to agreeing to establish the unicast connection with the first terminal. The temporary identifier is configured to indicate the first terminal to schedule a transmission resource in a process of establishing the unicast connection with the second terminal.

The third sending module 830 includes a sending sub module 831.

The sending sub module 831 is configured to return the connection establishment admission message carrying the temporary identifier to the first terminal.

Figure 18:
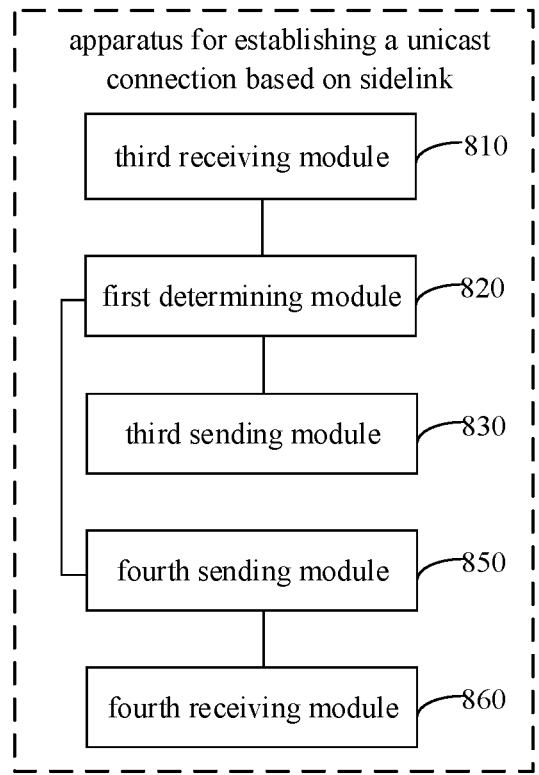
FIG. 18 is a block diagram illustrating an apparatus for establishing a unicast connection based on sidelink according to another exemplary embodiment.

As illustrated in FIG. 18, FIG. 18 is another block diagram illustrating an apparatus for establishing a unicast connection based on sidelink on the basis of the embodiment shown in FIG. 15. The apparatus further includes a fourth sending module 850 and a fourth receiving module 860.

The fourth sending module 850 is configured to return a connection establishment rejection message carrying target duration information to the second terminal in response to disagreeing to establish the unicast connection with the first terminal.

The fourth receiving module 860 is configured to receive the connection establishment request message resent by the first terminal at an end of a target period.

The target period refers to a time period lasting for a duration indicated by the target duration information and starting from a time point when the connection establishment rejection message is received.

Figure 19:
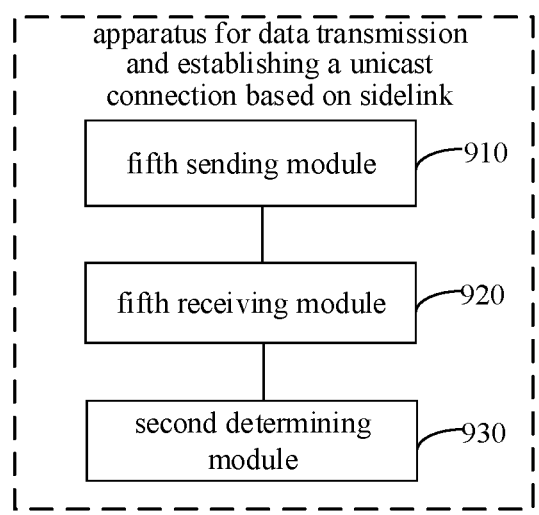
FIG. 19 is a block diagram illustrating an apparatus for establishing a unicast connection based on sidelink according to another exemplary embodiment.

As illustrated in FIG. 19, FIG. 19 is a block diagram illustrating an apparatus for establishing a unicast connection based on sidelink according to another exemplary embodiment. The apparatus is applied in a first terminal. The apparatus includes a fifth sending module 910, a fifth receiving module 920 and a second determining module 930.

The fifth sending module 910 is configured to send a connection establishment request message for establishing a unicast connection with a second terminal to the second terminal, the second terminal determining whether to agree to establish the unicast connection with the first terminal based on the connection establishment request message.

The fifth receiving module 920 is configured to receive a connection establishment message returned by the second terminal, the connection establishment message including a connection establishment admission message or a connection establishment rejection message.

The second determining module 930 is configured to determine a strategy for data transmission with the second terminal based on the connection establishment message.

Alternatively, the connection establishment admission message includes a temporary identifier allocated for the first terminal by the second terminal in response to the connection establishment message including the connection establishment admission message. The temporary identifier is configured to indicate the first terminal to schedule a transmission resource in a process of establishing the unicast connection based on sidelink.

Figure 20:
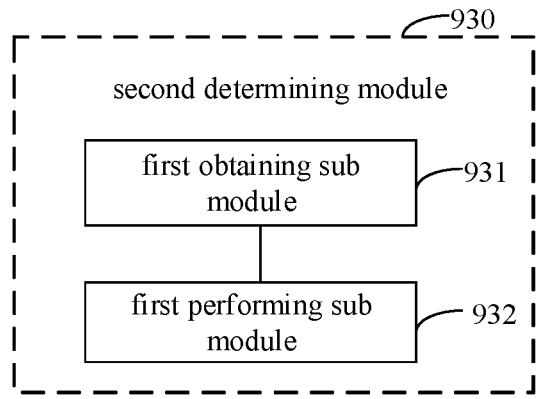
FIG. 20 is a block diagram illustrating an apparatus for establishing a unicast connection based on sidelink according to another exemplary embodiment.

As illustrated in FIG. 20, FIG. 20 is another block diagram illustrating an apparatus for establishing a unicast connection based on sidelink on the basis of the embodiment shown in FIG. 19. The second determining module 930 includes: a first obtaining sub module 931 and a first performing sub module 932.

The first obtaining sub module 931 is configured to obtain the temporary identifier in the connection establishment admission message.

The first performing sub module 932 is configured to perform data transmission with the second terminal based on indication of the temporary identifier.

Alternatively, the connection establishment rejection message includes a transmission indication message in response to the connection establishment message including the connection establishment rejection message. The transmission indication message is configured to indicate a mode of data transmission between the first terminal and the second terminal.

Figure 21:
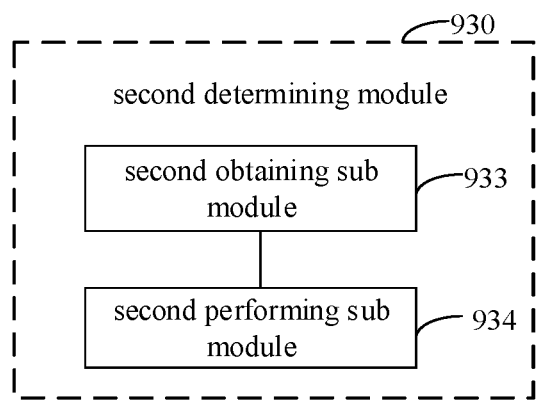
FIG. 21 is a block diagram illustrating an apparatus for establishing a unicast connection based on sidelink according to another exemplary embodiment.

As illustrated in FIG. 21, FIG. 21 is another block diagram illustrating an apparatus for establishing a unicast connection based on sidelink on the basis of the embodiment shown in FIG. 19. The second determining module 930 includes a second obtaining sub module 933 and a second performing sub module 934.

The second obtaining sub module 933 is configured to obtain the transmission indication message in the connection establishment rejection message.

The second performing sub module 934 is configured to perform the data transmission with the second terminal based on the transmission indication message.

Alternatively, the transmission indication message includes a redirection identifier.

Figure 22:
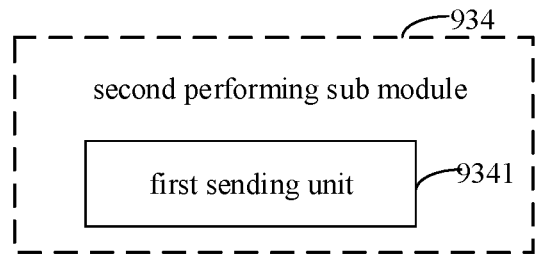
FIG. 22 is a block diagram illustrating an apparatus for establishing a unicast connection based on sidelink according to another exemplary embodiment.

As illustrated in FIG. 22, FIG. 22 is another block diagram illustrating an apparatus for establishing a unicast connection based on sidelink on the basis of the embodiment shown in FIG. 21. The second performing sub module 934 includes a first sending unit 9341.

The first sending unit 9341 is configured to broadcast target data to the second terminal based on the redirection identifier. The target data refers to data to be sent to the second terminal by the first terminal.

Alternatively, the transmission indication message includes a target multicast address identifier, the target multicast address identifier refers to a group address identifier of a group where the second terminal is located.

Figure 23:
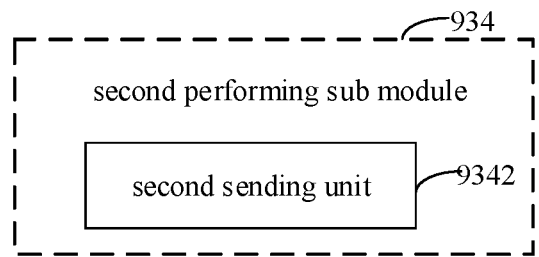
FIG. 23 is a block diagram illustrating an apparatus for establishing a unicast connection based on sidelink according to another exemplary embodiment.

As illustrated in FIG. 23, FIG. 23 is another block diagram illustrating an apparatus for establishing a unicast connection based on sidelink on the basis of the embodiment shown in FIG. 21. The second performing sub module 934 includes a second sending unit 9342.

The second sending unit 9342 is configured to send target data to a group address corresponding to the target multicast address identifier. The target data refers to data to be sent to the second terminal by the first terminal.

Figure 24:
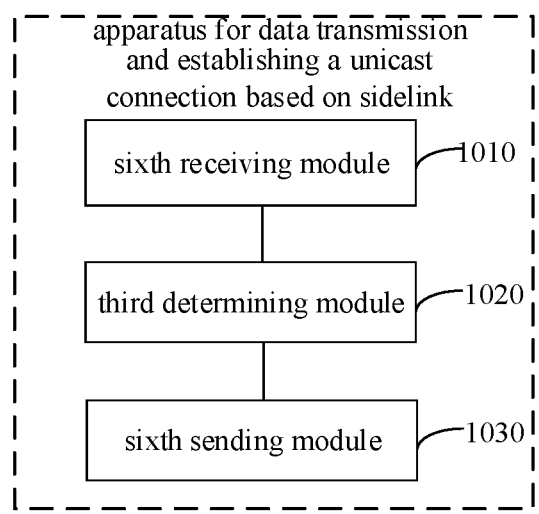
FIG. 24 is a block diagram illustrating an apparatus for establishing a unicast connection based on sidelink according to another exemplary embodiment.

As illustrated in FIG. 24, FIG. 24 is a block diagram illustrating an apparatus for establishing a unicast connection based on sidelink according to another exemplary embodiment. The apparatus is applied to a second terminal. The apparatus includes a sixth receiving module 1010, a third determining module 1020, and a sixth sending module 1030.

The sixth receiving module 1010 is configured to receive a connection establishment request message for establishing a unicast connection with the second terminal from a first terminal.

The third determining module 1020 is configured to determine whether to agree to establish the unicast connection with the first terminal based on the connection establishment request message.

The sixth sending module 1030 is configured to return a connection establishment message to the first terminal according to a determining result of whether to agree to establish the unicast connection with the first terminal. The connection establishment message includes a connection establishment admission message or a connection establishment rejection message. The first terminal determines a strategy for data transmission with the second terminal based on the connection establishment message.

Alternatively, the connection establishment admission message includes a temporary identifier allocated for the first terminal by the second terminal in response to the connection establishment message including the connection establishment admission message. The temporary identifier is configured to indicate the first terminal to schedule a transmission resource in a process of establishing the unicast connection based on sidelink.

Alternatively, the connection establishment rejection message includes a transmission indication message in response to the connection establishment message including the connection establishment rejection message. The transmission indication message is configured to indicate a mode of data transmission between the first terminal and the second terminal.

Alternatively, the transmission indication message includes a redirection identifier. The redirection identifier is configured to indicate the first terminal to broadcast target data to the second terminal, and the target data refers to data to be sent to the second terminal by the first terminal.

Alternatively, the transmission indication message includes a target multicast address identifier. The target multicast address identifier refers to a group address identifier of a group where the second terminal is located. The target multicast address identifier is configured to indicate the first terminal to send target data to a group address corresponding to the target multicast address identifier, and the target data refers to data to be sent to the second terminal by the first terminal.

With respect to the device embodiments, as they basically correspond to the method embodiments, the partial description of the method embodiments may be referred to for relevant points. The device embodiments described above are merely illustrative. The units described above as separate components may or may not be physically separated, and the components displayed as units may or may not be physical units, that is, they may be located in one location, or it can be distributed to multiple network units. Some or all of the modules can be selected according to actual needs to achieve the objectives of the solutions of the present disclosure. Those skills in the art can understand and implement without creative work.

Correspondingly, the present disclosure further provides a computer-readable storage medium having computer programs stored therein. The computer programs are configured to perform any of the method, applied to a first terminal side, for establishing a unicast connection based on sidelink.

Correspondingly, the present disclosure further provides a computer-readable storage medium having computer programs stored therein. The computer programs are configured to perform any of the method, applied to a second terminal side, for establishing a unicast connection based on sidelink.

Correspondingly, the present disclosure further provides a computer-readable storage medium having computer programs stored therein. The computer programs are configured to perform any of the method, applied to a first terminal side, for data transmission and establishing a unicast connection based on sidelink.

Correspondingly, the present disclosure further provides a computer-readable storage medium having computer programs stored therein. The computer programs are configured to perform any of the method, applied to a second terminal side, for data transmission and establishing a unicast connection based on sidelink according to the fourth aspect of embodiments of the present disclosure.

Correspondingly, the present disclosure further provides a device for establishing a unicast connection based on sidelink. The device is applied to a first terminal. The device includes: a processor; and memory configured to store instructions executable the processor. The processor is configured to: send a connection establishment request message for establishing a unicast connection with a second terminal to the second terminal, for determining by the second terminal, whether to agree to establish the unicast connection with the first terminal based on the connection establishment request message; receive a connection establishment admission message returned by the second terminal; and establish the unicast connection with the second terminal based on the connection establishment admission message.

Correspondingly, the present disclosure further provides a device for establishing a unicast connection based on sidelink. The device is applied to a second terminal. The device includes: a processor; and memory configured to store instructions executable the processor. The processor is configured to: receive a connection establishment request message for establishing a unicast connection with the second terminal from a first terminal; determine whether to agree to establish the unicast connection with the first terminal based on the connection establishment request message; and return a connection establishment admission message to the first terminal in response to agreeing to establish the unicast connection with the first terminal, the first terminal establishing the unicast connection with the second terminal based on the connection establishment admission message.

Figure 25:
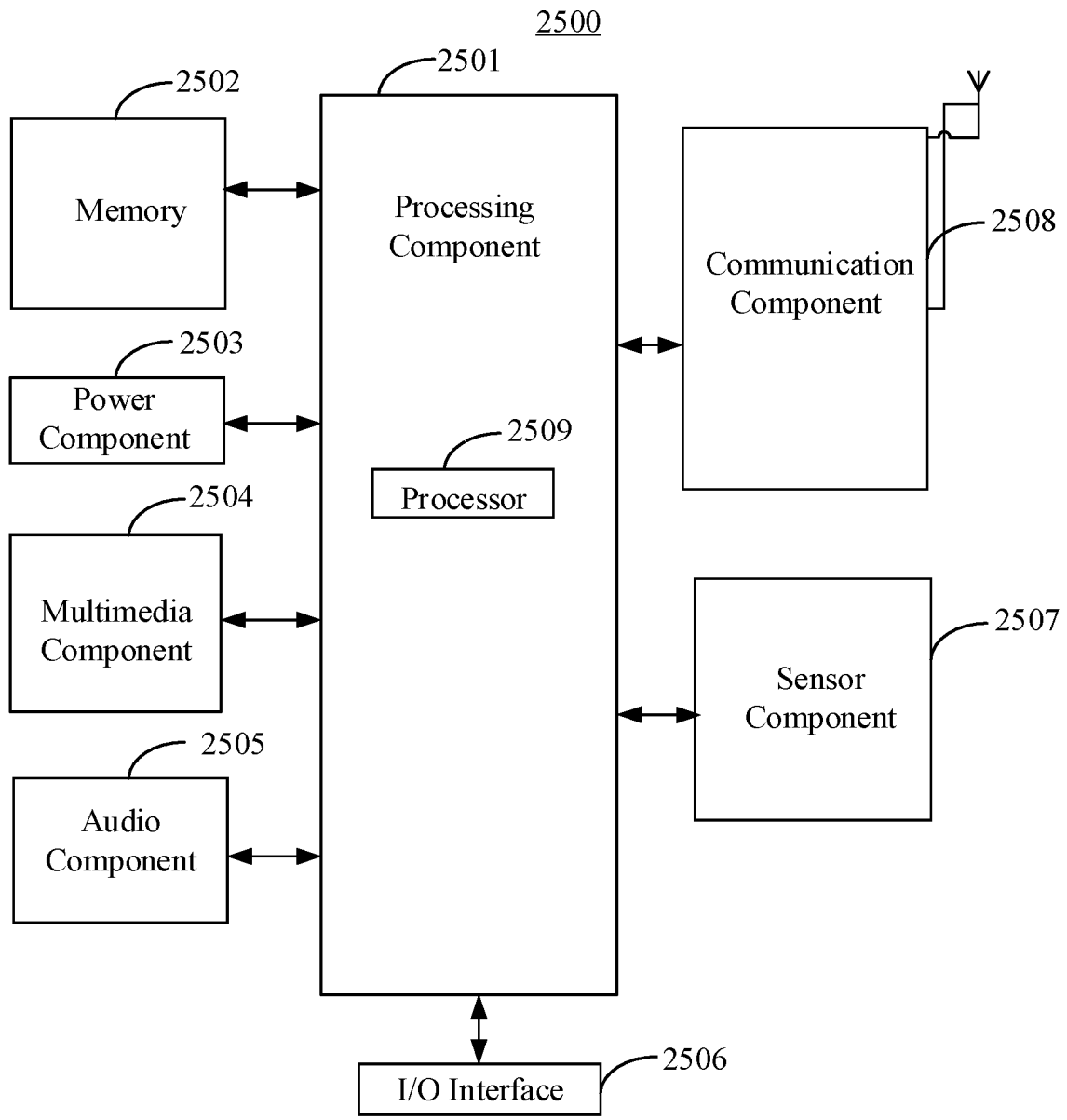
FIG. 25 is a schematic diagram illustrating a device for establishing a unicast connection based on sidelink according to an exemplary embodiment.

FIG. 25 is a schematic diagram illustrating a device for establishing a unicast connection based on sidelink according to an exemplary embodiment. As illustrated in FIG. 25, the device 2500 for establishing a unicast connection based on sidelink according to an exemplary embodiment is shown. The device 2500 may be a computer, a mobile phone, a digital broadcast terminal, a messaging device, a gaming console, a tablet, a medical device, exercise equipment, a personal digital assistant, and the like.

Referring to FIG. 25, the device 2500 may include one or more of the following components: a processing component 2501, memory 2502, a power component 2503, a multimedia component 2504, an audio component 2505, an input/output (I/O) interface 2506, a sensor component 2507, and a communication component 2508.

The processing component 2501 typically controls overall operations of the device 2500, such as the operations associated with display, telephone calls, data communications, camera operations, and recording operations. The processing component 2501 may include one or more processors 2509 to execute instructions to perform all or part of the steps in the above described methods. Moreover, the processing component 2501 may include one or more modules which facilitate the interaction between the processing component 2501 and other components. For instance, the processing component 2501 may include a multimedia module to facilitate the interaction between the multimedia component 2504 and the processing component 2501.

The memory 2502 is configured to store various types of data to support the operation of the device 2500. Examples of such data include instructions for any applications or methods operated on the 2500, contact data, phonebook data, messages, pictures, video, etc. The memory 2502 may be implemented using any type of volatile or non-volatile memory devices, or a combination thereof, such as a static random-access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 2503 provides power to various components of the device 2500. The power component 2503 may include a power management system, one or more power sources, and any other components associated with the generation, management, and distribution of power in the device 2500.

The multimedia component 2504 includes a screen providing an output interface between the device 2500 and the user. In some embodiments, the screen may include a liquid crystal display (LCD) and a touch panel (TP). If the screen includes the touch panel, the screen may be implemented as a touch screen to receive input signals from the user. The touch panel includes one or more touch sensors to sense touches, swipes, and gestures on the touch panel. The touch sensors may not only sense a boundary of a touch or swipe action, but also sense a period of time and a pressure associated with the touch or swipe action. In some embodiments, the multimedia component 2504 includes a front camera and/or a rear camera. The front camera and the rear camera may receive an external multimedia datum while the device 2500 is in an operation mode, such as a photographing mode or a video mode. Each of the front camera and the rear camera may be a fixed optical lens system or have focus and optical zoom capability.

The audio component 2505 is configured to output and/or input audio signals. For example, the audio component 2505 includes a microphone ("MIC") configured to receive an external audio signal when the device 2500 is in an operation mode, such as a call mode, a recording mode, and a voice recognition mode. The received audio signal may be further stored in the memory 2502 or transmitted via the communication component 2508. In some embodiments, the audio component 2505 further includes a speaker to output audio signals.

The I/O interface 2506 provides an interface between the processing component 2501 and peripheral interface modules, such as a keyboard, a click wheel, buttons, and the like. The buttons may include, but are not limited to, a home button, a volume button, a starting button, and a locking button.

The sensor component 2507 includes one or more sensors to provide status assessments of various aspects of the device 2500. For instance, the sensor component 2507 may detect an open/closed status of the device 2500, relative positioning of components, e.g., the display and the keypad, of the device 2500, a change in position of the device 2500 or a component of the device 2500, a presence or absence of user contact with the device 2500, an orientation or an acceleration/deceleration of the device 2500, and a change in temperature of the device 2500. The sensor component 2507 may include a proximity sensor configured to detect the presence of nearby objects without any physical contact. The sensor component 2507 may also include a light sensor, such as a CMOS or CCD image sensor, for use in imaging applications. In some embodiments, the sensor component 2507 may also include an accelerometer sensor, a gyroscope sensor, a magnetic sensor, a pressure sensor, or a temperature sensor.

The communication component 2508 is configured to facilitate communication, wired or wirelessly, between the device 2500 and other devices. The device 2500 can access a wireless network based on a communication standard, such as Wi-Fi, 2G, or 3G, or a combination thereof. In one exemplary embodiment, the communication component 2508 receives a broadcast signal or broadcast associated information from an external broadcast management system via a broadcast channel. In one exemplary embodiment, the communication component 2508 further includes a near field communication (NFC) module to facilitate short-range communications. For example, the NFC module may be implemented based on a radio frequency identification (RFID) technology, an infrared data association (IrDA) technology, an ultra-wideband (UWB) technology, a Bluetooth (BT) technology, and other technologies.

In exemplary embodiments, the device 2500 may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the above described methods.

In exemplary embodiments, there is also provided a non-transitory computer readable storage medium including instructions, such as included in the memory 2502, executable by the processor 2509 in the device 2500, for performing the above-described methods. For example, the non-transitory computer-readable storage medium may be a ROM, a RAM, a CD-ROM, a magnetic tape, a floppy disc, an optical data storage device, and the like.

When the instructions in the storage medium are executed by the processor, the device 2500 is capable of performing any of the above methods, applied to either a first terminal side or a second terminal side, for establishing a unicast connection based on sidelink.

Correspondingly, the present disclosure further provides a device for data transmission and establishing a unicast connection based on sidelink. The device is applied to a first terminal. The device includes a processor; and memory configured to store instructions executable the processor.

The processor is configured to: send a connection establishment request message for establishing a unicast connection with a second terminal to the second terminal, the second terminal determining whether to agree to establish the unicast connection with the first terminal based on the connection establishment request message; receive a connection establishment message returned by the second terminal, the connection establishment message including a connection establishment admission message or a connection establishment rejection message; and determine a strategy for data transmission with the second terminal based on the connection establishment message.

Correspondingly, the present disclosure further provides a device for data transmission and establishing a unicast connection based on sidelink. The device is applied to a second terminal. The device includes: a processor; and memory configured to store instructions executable the processor.

The processor is configured to: receive a connection establishment request message for establishing a unicast connection with the second terminal from a first terminal; determine whether to agree to establish the unicast connection with the first terminal based on the connection establishment request message; and return a connection establishment message to the first terminal according to a determining result of whether to agree to establish the unicast connection with the first terminal, the connection establishment message including a connection establishment admission message or a connection establishment rejection message, the first terminal determining a strategy for data transmission with the second terminal based on the connection establishment message.

Figure 26:
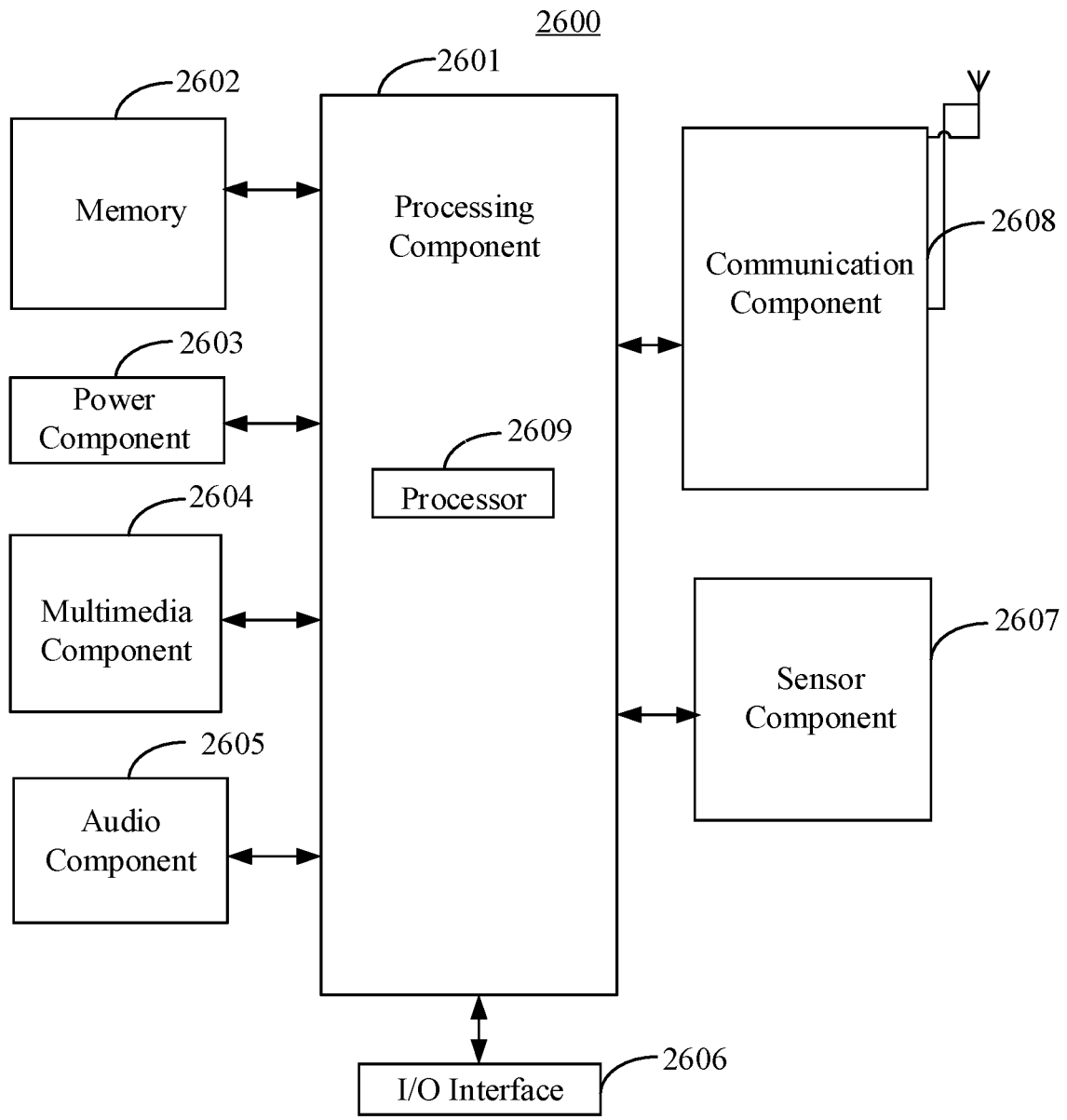
FIG. 26 is a schematic diagram illustrating a device for data transmission of establishing a unicast connection based on sidelink according to an exemplary embodiment.

FIG. 26 is a schematic diagram illustrating a device for data transmission and establishing a unicast connection based on sidelink according to an exemplary embodiment. As illustrated in FIG. 26, the device 2600 for data transmission and establishing a unicast connection based on sidelink according to an exemplary embodiment is shown. The device 2600 may be a computer, a mobile phone, a digital broadcast terminal, a messaging device, a gaming console, a tablet, a medical device, exercise equipment, a personal digital assistant, and the like.

Referring to FIG. 26, the device 2600 may include one or more of the following components: a processing component 2601, memory 2602, a power component 2603, a multimedia component 2604, an audio component 2605, an input/output (I/O) interface 2606, a sensor component 2607, and a communication component 2608.

The processing component 2601 typically controls overall operations of the device 2600, such as the operations associated with display, telephone calls, data communications, camera operations, and recording operations. The processing component 2601 may include one or more processors 2609 to execute instructions to perform all or part of the steps in the above described methods. Moreover, the processing component 2601 may include one or more modules which facilitate the interaction between the processing component 2601 and other components. For instance, the processing component 2601 may include a multimedia module to facilitate the interaction between the multimedia component 2604 and the processing component 2601.

The memory 2602 is configured to store various types of data to support the operation of the device 2600. Examples of such data include instructions for any applications or methods operated on the 2600, contact data, phonebook data, messages, pictures, video, etc. The memory 2602 may be implemented using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 2603 provides power to various components of the device 2600. The power component 2603 may include a power management system, one or more power sources, and any other components associated with the generation, management, and distribution of power in the device 2600.

The multimedia component 2604 includes a screen providing an output interface between the device 2600 and the user. In some embodiments, the screen may include a liquid crystal display (LCD) and a touch panel (TP). If the screen includes the touch panel, the screen may be implemented as a touch screen to receive input signals from the user. The touch panel includes one or more touch sensors to sense touches, swipes, and gestures on the touch panel. The touch sensors may not only sense a boundary of a touch or swipe action, but also sense a period of time and a pressure associated with the touch or swipe action. In some embodiments, the multimedia component 2604 includes a front camera and/or a rear camera. The front camera and the rear camera may receive an external multimedia datum while the device 2600 is in an operation mode, such as a photographing mode or a video mode. Each of the front camera and the rear camera may be a fixed optical lens system or have focus and optical zoom capability.

The audio component 2605 is configured to output and/or input audio signals. For example, the audio component 2605 includes a microphone ("MIC") configured to receive an external audio signal when the device 2600 is in an operation mode, such as a call mode, a recording mode, and a voice recognition mode. The received audio signal may be further stored in the memory 2602 or transmitted via the communication component 2608. In some embodiments, the audio component 2605 further includes a speaker to output audio signals.

The I/O interface 2606 provides an interface between the processing component 2601 and peripheral interface modules, such as a keyboard, a click wheel, buttons, and the like. The buttons may include, but are not limited to, a home button, a volume button, a starting button, and a locking button.

The sensor component 2607 includes one or more sensors to provide status assessments of various aspects of the device 2600. For instance, the sensor component 2607 may detect an open/closed status of the device 2600, relative positioning of components, e.g., the display and the keypad, of the device 2600, a change in position of the device 2600 or a component of the device 2600, a presence or absence of user contact with the device 2600, an orientation or an acceleration/deceleration of the device 2600, and a change in temperature of the device 2600. The sensor component 2607 may include a proximity sensor configured to detect the presence of nearby objects without any physical contact. The sensor component 2607 may also include a light sensor, such as a CMOS or CCD image sensor, for use in imaging applications. In some embodiments, the sensor component 2607 may also include an accelerometer sensor, a gyroscope sensor, a magnetic sensor, a pressure sensor, or a temperature sensor.

The communication component 2608 is configured to facilitate communication, wired or wirelessly, between the device 2600 and other devices. The device 2600 can access a wireless network based on a communication standard, such as WiFi, 2G, or 3G, or a combination thereof. In one exemplary embodiment, the communication component 2608 receives a broadcast signal or broadcast associated information from an external broadcast management system via a broadcast channel. In one exemplary embodiment, the communication component 2608 further includes a near field communication (NFC) module to facilitate short-range communications. For example, the NFC module may be implemented based on a radio frequency identification (RFID) technology, an infrared data association (IrDA) technology, an ultra-wideband (UWB) technology, a Bluetooth (BT) technology, and other technologies.

In exemplary embodiments, the device 2600 may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the above-described methods.

In exemplary embodiments, there is also provided a non-transitory computer readable storage medium including instructions, such as included in the memory 2602, executable by the processor 2609 in the device 2600, for performing the above-described methods. For example, the non-transitory computer-readable storage medium may be a ROM, a RAM, a CD-ROM, a magnetic tape, a floppy disc, an optical data storage device, and the like.

When the instructions in the storage medium are executed by the processor, the device 2600 is capable of performing any of the above methods, applied to either a first terminal side or a second terminal side, for establishing a unicast connection based on sidelink.

Other embodiments of the present disclosure will be apparent to those skilled in the art from consideration of the specification and practice of the invention disclosed here. This application is intended to cover any variations, uses, or adaptations of the present disclosure following the general principles thereof and including such departures from the present disclosure as come within known or customary practice in the art. It is intended that the specification and examples be considered as exemplary only, with a true scope and spirit of the invention being indicated by the following claims.

It will be appreciated that the present disclosure is not limited to the exact construction that has been described above and illustrated in the accompanying drawings, and that various modifications and changes can be made without departing from the scope thereof. It is intended that the scope of the present disclosure only be limited by the appended claims.

What is claimed is:

1. A method for establishing a unicast connection based on sidelink, the method applied to a first terminal and comprising:
   sending a connection establishment request message for establishing a unicast connection with a second terminal to the second terminal, for determining by the second terminal, whether to agree to establish the unicast connection with the first terminal based on the connection establishment request message;
   receiving a connection establishment admission message returned by the second terminal; and
   establishing the unicast connection with the second terminal based on the connection establishment admission message;
   wherein, the connection establishment request message carries a terminal identifier of the first terminal and connection establishment associated information, the connection establishment associated information at least comprises connection reason information configured to identify a connection reason for establishing the unicast connection with the second terminal.

2. The method of claim 1, wherein, the connection establishment admission message comprises a temporary identifier allocated for the first terminal by the second terminal, the temporary identifier is configured to indicate the first terminal to schedule a transmission resource in a process of establishing the unicast connection with the second terminal.

3. The method of claim 1, after sending the connection establishment request message for establishing the unicast connection with the second terminal to the second terminal, further comprising:
   receiving a connection establishment rejection message returned by the second terminal, the connection establishment rejection message carrying target duration information; and
   resending the connection establishment request message to the second terminal in response to an end of a target period;

wherein, the target period refers to a time period lasting for a duration indicated by the target duration information and starting from a time point when the connection establishment rejection message is received.

4. A communication system implementing the method of claim 1, comprising the first terminal and the second terminal, wherein the second terminal is configured to determine whether to agree to establish the unicast connection with the first terminal based on the connection establishment request message, and the first terminal is configured to establish the unicast connection with the second terminal based on the connection establishment admission message returned by the second terminal, thereby improving speed of establishing the unicast connection between the first terminal and the second terminal based on sidelink.

5. The communication system of claim 4, wherein the connection establishment request message sent by the first terminal includes a terminal identifier of the first terminal and the connection establishment associated information, the connection establishment associated information includes connection reason information configured to identify a connection reason for establishing the unicast connection with the second terminal, the second terminal is configured to determine whether to agree to establish the unicast connection with the first terminal based on the connection establishment associated information, the connection establishment admission message includes a temporary identifier allocated for the first terminal by the second terminal, the temporary identifier is configured to indicate the first terminal to schedule a transmission resource in a process of establishing the unicast connection with the second terminal, thereby improving security of terminal information in establishing the unicast connection.

6. A method for establishing a unicast connection based on sidelink, the method applied to a second terminal and comprising:
receiving a connection establishment request message for establishing a unicast connection with the second terminal from a first terminal;
determining whether to agree to establish the unicast connection with the first terminal based on the connection establishment request message; and
returning a connection establishment admission message to the first terminal in response to agreeing to establish the unicast connection with the first terminal, the first terminal establishing the unicast connection with the second terminal based on the connection establishment admission message;
wherein the connection establishment request message carries a terminal identifier of the first terminal and connection establishment associated information, the connection establishment associated information at least comprises connection reason information configured to identify a connection reason for establishing the unicast connection with the second terminal;
determining whether to agree to establish the unicast connection with the first terminal based on the connection establishment request message comprises:
determining whether to agree to establish the unicast connection with the first terminal based on the connection establishment associated information.

7. The method of claim 6, further comprising:
allocating a temporary identifier for the first terminal in response to agreeing to establish the unicast connection with the first terminal, wherein the temporary identifier is configured to indicate the first terminal to schedule a transmission resource in a process of establishing the unicast connection with the second terminal;
wherein, returning the connection establishment admission message to the first terminal comprises:
returning the connection establishment admission message carrying the temporary identifier to the first terminal.

8. The method of claim 6, further comprising:
returning a connection establishment rejection message carrying target duration information to the first terminal in response to disagree to establish the unicast connection with the first terminal; and
receiving the connection establishment request message resent by the first terminal at an end of a target period;
wherein, the target period refers to a time period lasting for a duration indicated by the target duration information and starting from a time point when the connection establishment rejection message is received.

9. A method for data transmission, the method applied to a first terminal and comprising:
sending a connection establishment request message for establishing a unicast connection with a second terminal to the second terminal, the second terminal determining whether to agree to establish the unicast connection with the first terminal based on the connection establishment request message;
receiving a connection establishment message returned by the second terminal, the connection establishment message comprising a connection establishment admission message or a connection establishment rejection message; and
determining a strategy for data transmission with the second terminal based on the connection establishment message;
wherein the connection establishment admission message comprises a temporary identifier allocated for the first terminal by the second terminal in response to the connection establishment message comprising the connection establishment admission message, the temporary identifier is configured to indicate the first terminal to schedule a transmission resource in a process of establishing the unicast connection based on sidelink;
wherein the connection establishment rejection message comprises a transmission indication message in response to the connection establishment message comprising the connection establishment rejection message, the transmission indication message is configured to indicate a mode of data transmission between the first terminal and the second terminal.

10. The method of claim 9, wherein
determining the strategy for data transmission with the second terminal based on the connection establishment message comprises:
obtaining the temporary identifier in the connection establishment admission message; and
performing data transmission with the second terminal based on indication of the temporary identifier.

11. The method of claim 9, wherein
determining the strategy for data transmission with the second terminal based on the connection establishment message comprises:
obtaining the transmission indication message in the connection establishment rejection message; and
performing the data transmission with the second terminal based on the transmission indication message.

12. The method of claim 11, wherein, the transmission indication message comprises a redirection identifier, and performing the data transmission with the second terminal based on the transmission indication message comprises:
broadcasting target data to the second terminal based on the redirection identifier, wherein the target data refers to data to be sent to the second terminal by the first terminal.

13. The method of claim 11, wherein, the transmission indication message comprises a target multicast address identifier, the target multicast address identifier refers to a group address identifier of a group where the second terminal is located,
performing the data transmission with the second terminal based on the transmission indication message comprises:
sending target data to a group address corresponding to the target multicast address identifier, wherein the target data refers to data to be sent to the second terminal by the first terminal.

14. A method for data transmission, the method applied to a second terminal and comprising:
receiving a connection establishment request message for establishing a unicast connection with the second terminal from a first terminal;
determining whether to agree to establish the unicast connection with the first terminal based on the connection establishment request message; and
returning a connection establishment message to the first terminal according to a determining result of whether to agree to establish the unicast connection with the first terminal, the connection establishment message comprising a connection establishment admission message or a connection establishment rejection message, the first terminal determining a strategy for data transmission with the second terminal based on the connection establishment message;
wherein the connection establishment admission message comprises a temporary identifier allocated for the first terminal by the second terminal in response to the connection establishment message comprising the connection establishment admission message, the temporary identifier is configured to indicate the first terminal to schedule a transmission resource in a process of establishing the unicast connection based on sidelink;
wherein the connection establishment rejection message comprises a transmission indication message in response to the connection establishment message comprising the connection establishment rejection message, the transmission indication message is configured to indicate a mode of data transmission between the first terminal and the second terminal.

15. The method of claim 14, wherein, the transmission indication message comprises a redirection identifier, the redirection identifier is configured to indicate the first terminal to broadcast target data to the second terminal, and the target data refers to data to be sent to the second terminal by the first terminal.

16. The method of claim 14, wherein, the transmission indication message comprises a target multicast address identifier, the target multicast address identifier refers to a group address identifier of a group where the second terminal is located, the target multicast address identifier is configured to indicate the first terminal to send target data to a group address corresponding to the target multicast address identifier, and the target data refers to data to be sent to the second terminal by the first terminal.

* * * * *